United States Patent
Sun et al.

(10) Patent No.: US 12,540,286 B2
(45) Date of Patent: Feb. 3, 2026

(54) TWO STAGE CATALYTIC PROCESS FOR PYROLYSIS OIL UPGRADING TO BTX

(71) Applicant: Saudi Arabian Oil Company, Dhahran (SA)

(72) Inventors: Miao Sun, Dhahran (SA); Sohel K Shaikh, Dhahran (SA); Ibrahim A. Abba, Dhahran (SA); Noor Al-Mana, Dhahran (SA); Zhonglin Zhang, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 586 days.

(21) Appl. No.: 18/073,968

(22) Filed: Dec. 2, 2022

(65) Prior Publication Data

US 2023/0093135 A1 Mar. 23, 2023

Related U.S. Application Data

(62) Division of application No. 17/365,008, filed on Jul. 1, 2021, now Pat. No. 11,578,276.

(51) Int. Cl.
*C10G 65/12* (2006.01)
*C10G 45/46* (2006.01)

(52) U.S. Cl.
CPC ............. *C10G 65/12* (2013.01); *C10G 45/46* (2013.01); *C10G 2300/1096* (2013.01);
(Continued)

(58) Field of Classification Search
CPC .............. C10G 65/12; C10G 45/46; C10G 2300/1096; C10G 2300/4006;
(Continued)

(56) References Cited

U.S. PATENT DOCUMENTS 7,431,831 B2 * 10/2008 Farshid .................. C10G 47/26
  208/68
7,935,243 B2 * 5/2011 Chabot .................. C10G 65/12
  208/57
(Continued)

FOREIGN PATENT DOCUMENTS

WO 2013151986 A1 10/2013
WO 2017093056 A1 6/2017

OTHER PUBLICATIONS

Guerzoni et al. "Catalytic Cracking of a Hydrocarbon Mixture on Combinations of HY and HZSM-5 Zeolites" Chemistry Department, Journal of Catalysis 139, 289-303 (1993), 15 pgs.
(Continued)

*Primary Examiner* — Dapinder Singh
(74) *Attorney, Agent, or Firm* — DINSMORE & SHOHL LLP

(57) ABSTRACT

A method for upgrading pyrolysis oil includes contacting a pyrolysis oil feed with hydrogen in the presence of a mixed metal oxide catalyst in a first slurry reactor, where: the pyrolysis oil feed comprises multi-ring aromatic compounds comprising greater than or equal to sixteen carbon atoms, and contacting the pyrolysis oil feed with hydrogen in the presence of the mixed metal oxide catalyst in the first slurry reactor to convert at least a portion of the multi-ring aromatic compounds in the pyrolysis oil feed to light aromatic compounds comprising di-aromatic compounds, tri-aromatic compounds, or both, passing an intermediate stream comprising the light aromatic compounds to a second slurry reactor downstream of the first slurry reactor; and contacting the intermediate stream with hydrogen in the presence of a mesoporous zeolite supported metal catalyst in a second slurry reactor.

20 Claims, 4 Drawing Sheets

(52) U.S. Cl.
CPC ............... *C10G 2300/4006* (2013.01); *C10G 2300/4012* (2013.01); *C10G 2400/30* (2013.01)

(58) Field of Classification Search
CPC ........ C10G 2300/4012; C10G 2400/30; C10G 47/20; C07C 4/06; C07C 2/76; C07C 2529/40; C07C 2529/18; C07C 6/126; B01J 2029/062; B01J 2229/14; B01J 2229/16; B01J 2229/186; B01J 2229/37; B01J 2229/38; B01J 2229/42; B01J 2523/00; B01J 23/002; B01J 23/83; B01J 23/882; B01J 27/19; B01J 29/26; B01J 29/48; B01J 29/7615; B01J 29/7815; B01J 37/033; B01J 37/088
See application file for complete search history.

(56) References Cited

U.S. PATENT DOCUMENTS

| | | | |
|---|---|---|---|
| 9,605,217 B2* | 3/2017 | Sundararaman | C10G 49/12 |
| 10,597,590 B2* | 3/2020 | Van Wees | C10G 47/26 |
| 10,751,709 B1 | 8/2020 | Sun et al. | |
| 10,751,710 B1 | 8/2020 | Sun | |
| 2009/0005052 A1 | 1/2009 | Abusch-Magder et al. | |
| 2009/0173666 A1 | 7/2009 | Zhou | |
| 2011/0210045 A1* | 9/2011 | Kou | C10G 47/02 208/59 |
| 2015/0014217 A1* | 1/2015 | Smiley | C10G 45/16 208/59 |
| 2015/0267130 A1* | 9/2015 | Butley | C10L 1/026 568/321 |
| 2016/0257889 A1 | 9/2016 | Abdullah et al. | |
| 2016/0362618 A1 | 12/2016 | Oprins et al. | |
| 2017/0009157 A1 | 1/2017 | Oprins | |
| 2017/0050177 A1 | 2/2017 | Greeley et al. | |
| 2017/0058210 A1 | 3/2017 | Pelaez et al. | |
| 2018/0361372 A1 | 12/2018 | Tammana et al. | |
| 2019/0016975 A1 | 1/2019 | Coleman et al. | |
| 2019/0078027 A1 | 3/2019 | Deimund et al. | |
| 2019/0078029 A1 | 3/2019 | Johnson et al. | |
| 2019/0203130 A1 | 7/2019 | Mukherjee | |
| 2021/0001321 A1 | 1/2021 | Sun | |
| 2021/0009907 A1 | 1/2021 | Frecon et al. | |
| 2021/0130715 A1 | 5/2021 | Xu | |

OTHER PUBLICATIONS

Jimenez-Cruz et al. "Molecular size evaluation of linear and branched paraffins from the gasoline pool by DFT quantum chemical calculations" Science Direct, Fuel 83 (2004) 2183-2188, 7 pgs.
Kim et al. "Novel Ni2P/zeolite catalysts for naphthalene hydrocracking to BTX" Catalysis Communications 45 (2014) 133-138, 6 pgs.
Kim et al. "Morphology effect of b-zeolite supports for Ni2P catalysts on the hydrocracking of polycyclic aromatic hydrocarbons to benzene, toluene, and xylene" Journal of Catalysis 351 (2017) 67-78, 12 pgs.
Kondoh et al., "Catalytic cracking of heavy oil over TiO2—ZrO2 catalysts under superheated steam conditions", Fuel, vol. 167, pp. 288-294, 2016.
Kondoh et al., "Effects of H2O Addition on Oil Sand Bitumen Cracking Using a CeO2—ZrO2—Al2O3-FeOx Catalyst", Energy & Fuels, vol. 30, pp. 10358-10364, 2016.
Kondoh et al., "Upgrading of oil sand bitumen over an iron oxide catalyst using sub- and super-critical water", Fuel Processing Technology, vol. 145, pp. 96-101, 2016.
Lapinas et al. "Catalytic Hydrogenation and Hydrocracking of Fluorene: Reaction Pathways, Kinetics, and Mechanisms" Ind. Eng. Chem. Res. 1991, 30, 42-50, 9 pgs.
Leite et al. "Hydrocracking of phenanthrene over bifunctional Pt catalysts" Catalysis Today 65 (2001) 241-247, 7 pgs.
Lemberton et al. "Catalytic hydroconversion of simulated coal tars" Applied Catalysis A: General, 79 (1991) 115-126, 12 pgs.
Matsui et al. "Explanation of Product Distribution of Hydrocracking Reaction of Aromatic Hydrocarbons with Nickel-Loaded Zeolites Based on CAMD Study on Interaction between Zeolites and Substrates" Energy & Fuels (1995) 9, 435-438, 4 pgs.
Park et al. "Hydro-conversion of 1-methyl naphthalene into (alkyl)benzenes over alumina-coated USY zeolite-supported NiMOS catalysts" Fuel 90 (2011) 182-189, 8 pgs.
Park et al. "Mild hydrocracking of 1-methyl naphthalene (1-MN) over alumina modified zeolite" Journal of Industrial and Engineering Chemistry 19 (2013) 627-632, 6 pgs.
Tailleur et al. The effect of aromatics on paraffin mild hydrocracking reactions (WNiPd/CeY—Al2O3), Fuel Processing Technology 89 (2008) 808-818, 11 pgs.
U.S. Office Action dated Jan. 2, 2022 pertaining to U.S. Appl. No. 17/364,990, filed Jul. 1, 2021 (14 pages).

* cited by examiner

TWO STAGE CATALYTIC PROCESS FOR PYROLYSIS OIL UPGRADING TO BTX

CROSS-REFERENCE TO RELATED APPLICATION

This application is a divisional application of U.S. patent application Ser. No. 17/365,008 filed Jul. 1, 2021, the entire disclosure of which is hereby incorporated in the present disclosure by reference.

BACKGROUND

Field

The present disclosure generally relates to methods and systems for upgrading pyrolysis oil, more specifically, methods and systems for upgrading pyrolysis oil to light aromatic compounds using two stage catalytic process.

Technical Background

Crude oil can be converted to valuable chemical intermediates and products through one or more refinery processes. The refinery processes can include steam cracking, in which larger hydrocarbons in the crude oil are cracked to form smaller hydrocarbons. Steam cracking units produce a bottom stream, which is referred to as pyrolysis oil. The pyrolysis oil may include an increased concentration of aromatic compounds compared to the crude oil feedstock. In many crude oil processing facilities, this pyrolysis oil is burned as fuel. However, the aromatic compounds in the pyrolysis oil can be converted to greater value chemical products and intermediates, which can be used as building blocks in chemical synthesis processes. For example, aromatic compounds from the pyrolysis oil can be converted into xylenes, which can be the initial building blocks for producing terephthalic acid, which can then be used to produce polyesters. The aromatic compounds in the pyrolysis oil can be upgraded to many other greater value aromatic products and intermediates. The market demand for these greater value aromatic compounds continues to grow.

SUMMARY

Multi-ring aromatic compounds in the pyrolysis oil can be converted to light aromatic compounds, which can include benzene, toluene, ethylbenzene, xylenes (BTEX), other aromatic compounds, or combinations of these by various reactions, such as, but not limited to hydrogenation, ring opening, disproportionation, dealkylation, transalkylation, cracking, or aromatic cracking. In general, these conventional processes convert a portion of the multi-ring aromatic compounds in the pyrolysis oil to light aromatic compounds in a single step. However, the single step process may be complex and insufficient to meet the demand for BTEX. Further, these conventional process may be difficult to accomplish without employing severe conditions.

Accordingly, ongoing needs exist for improved systems and methods for upgrading pyrolysis oils to produce light aromatic compounds to increase the yield of BTEX using mild processing conditions. Embodiments of the present disclosure meet this need by providing a two stage catalytic process, which may upgrade pyrolysis oils to BTEX in a single process by using two slurry reactors in series. The first slurry reactor may include a mixed metal oxide catalyst and may be operable to convert at least a portion of multi-ring compounds in the pyrolysis oil to intermediate aromatic compounds, such as di-aromatic compounds. The second slurry reactor may include a mesoporous zeolite supported metal catalyst and may be operable to convert at least a portion of the intermediate aromatic compounds to BTEX. The methods and systems may convert a portion of the multi-ring aromatic compounds in the pyrolysis oil to BTEX in a two stage catalytic process, without conducting a subsequent chemical reaction step. The methods and systems may also produce greater yields of BTEX from upgrading pyrolysis under mild conditions compared to upgrading pyrolysis oil according to conventional methods.

According to one or more aspects of the present disclosure, a method for upgrading pyrolysis oil may include contacting a pyrolysis oil feed with hydrogen in the presence of a mixed metal oxide catalyst in a first slurry reactor. The pyrolysis oil feed may include multi-ring aromatic compounds comprising greater than or equal to sixteen carbon atoms. The mixed metal oxide catalyst may include a plurality of catalyst particles and each of the plurality of catalyst particles comprises a plurality of different metal oxides. The method may further include contacting the pyrolysis oil feed with hydrogen in the presence of the mixed metal oxide catalyst in the first slurry reactor to convert at least a portion of the multi-ring aromatic compounds in the pyrolysis oil feed to light aromatic compounds comprising di-aromatic compounds, tri-aromatic compounds, or both, and passing an intermediate stream comprising the light aromatic compounds to a second slurry reactor downstream of the first slurry reactor. The method may further include contacting the intermediate stream with hydrogen in the presence of a mesoporous zeolite supported metal catalyst in a second slurry reactor to convert at least a portion of the light aromatic compounds in the intermediate stream to react to form aromatic compounds having six to eight carbon atoms.

According to one or more other aspects of the present disclosure, a system for upgrading pyrolysis oil may include a first slurry reactor comprising a mixed metal oxide catalyst. The mixed metal oxide catalyst may include a plurality of catalyst particles and each of the plurality of catalyst particles comprises a plurality of different metal oxides. The first slurry reactor may be operable to contact a pyrolysis oil feed with hydrogen in the presence of the mixed metal oxide catalyst to produce a first reactor effluent comprising light aromatic compounds that include di-aromatic compounds, tri-aromatic compounds, or both. The system may further include a first separator disposed downstream of the first slurry reactor and operable to separate the first reactor effluent to produce a used mixed metal oxide catalyst and an intermediate stream comprising the light aromatic compounds, and a second slurry reactor downstream of the first separator and comprising a mesoporous zeolite supported metal catalyst. The second slurry reactor may be operable to contact the intermediate stream with hydrogen in the presence of the mesoporous zeolite supported metal catalyst to produce a second reactor effluent comprising aromatic compounds having six to eight carbon atoms. The system may further include a second separator disposed downstream of the second slurry reactor and operable to separate the second reactor effluent to produce a used mesoporous zeolite supported metal catalyst and at least one product effluent comprising aromatic compounds having six to eight carbon atoms.

Additional features and advantages of the technology described in this disclosure will be set forth in the detailed description which follows, and in part will be readily apparent to those skilled in the art from the description or recognized by practicing the technology as described in this disclosure, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

Figure 1:
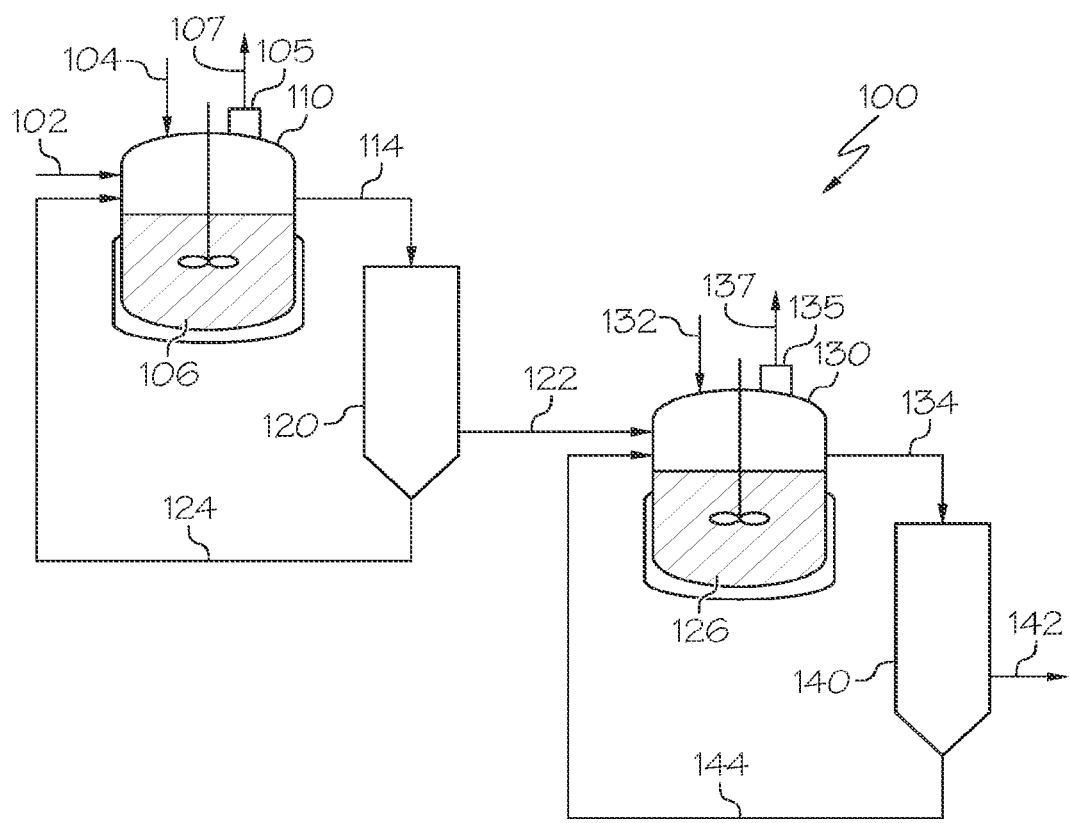
FIG. 1 schematically depicts a generalized flow diagram of a system for upgrading a pyrolysis oil, according to one or more embodiments shown and described in this disclosure.

For the purpose of describing the simplified schematic illustration and description of FIG. 1, the numerous valves, temperature sensors, electronic controllers, and the like that may be employed and well known to those of ordinary skill in the art of certain chemical processing operations are not included. Further, accompanying components that are often included in chemical processing operations, such as, for example, air supplies, heat exchangers, surge tanks, catalyst hoppers, or other related systems are not depicted. It would be known that these components are within the spirit and scope of the present embodiments disclosed. However, operational components, such as those described in the present disclosure, may be added to the embodiments described in this disclosure.

It should further be noted that arrows in the drawings refer to process streams. However, the arrows may equivalently refer to transfer lines that may serve to transfer process steams between two or more system components. Additionally, arrows that connect to system components define inlets or outlets in each given system component. The arrow direction corresponds generally with the major direction of movement of the materials of the stream contained within the physical transfer line signified by the arrow. Furthermore, arrows that do not connect two or more system components signify a product stream which exits the depicted system or a system inlet stream which enters the depicted system. Product streams may be further processed in accompanying chemical processing systems or may be commercialized as end products. System inlet streams may be streams transferred from accompanying chemical processing systems or may be non-processed feedstock streams. Some arrows may represent recycle streams, which are effluent streams of system components that are recycled back into the system. However, it should be understood that any represented recycle stream, in some embodiments, may be replaced by a system inlet stream of the same material, and that a portion of a recycle stream may exit the system as a system product.

Additionally, arrows in the drawings may schematically depict process steps of transporting a stream from one system component to another system component. For example, an arrow from one system component pointing to another system component may represent "passing" a system component effluent to another system component, which may include the contents of a process stream "exiting" or being "removed" from one system component and "introducing" the contents of that product stream to another system component.

It should be understood that two or more process streams are "mixed" or "combined" when two or more lines intersect in the schematic flow diagram of FIG. 1. Mixing or combining may also include mixing by directly introducing both streams into a like reactor, separation device, or other system component. For example, it should be understood that when two streams are depicted as being combined directly prior to entering a separator or reactor, that in some embodiments the streams could equivalently be introduced into the separator or reactor and be mixed in the reactor.

Reference will now be made in greater detail to various embodiments of the present disclosure, some embodiments of which are illustrated in the accompanying drawings. Whenever possible, the same reference numerals will be used throughout the drawings to refer to the same or similar parts.

DETAILED DESCRIPTION

Embodiments of the present disclosure are directed to methods and systems for upgrading pyrolysis oil. Referring now to FIG. 1, one embodiment of a system 100 of the present disclosure for upgrading pyrolysis oil feed 102 is schematically depicted. The systems 100 for upgrading pyrolysis oil feed 102 may comprise a first slurry reactor 110, a first separator 120 disposed downstream of the first slurry reactor 110, a second slurry reactor 130 disposed downstream of the first separator 120, and a second separator 140 disposed downstream of the second slurry reactor 130. The first slurry reactor 110 may include a mixed metal oxide catalyst 106 comprising a plurality of catalyst particles and each of the plurality of catalyst particles comprises a plurality of different metal oxides. The first slurry reactor 110 may be operable to contact the pyrolysis oil feed 102 with hydrogen 104 in the presence of the mixed metal oxide catalyst 106 to produce a first reactor effluent 114. The first separator 120 disposed downstream of the first slurry reactor 110 may be operable to separate the first reactor effluent 114 to produce a used mixed metal oxide catalyst 124 and an intermediate stream 122 comprising light aromatic compounds. The second slurry reactor 130 may be disposed downstream of the first separator 120 and may be operable to contact the intermediate stream 122 with hydrogen 132 in the presence of the mesoporous zeolite supported metal catalyst 126 to produce a second reactor effluent 134. The second separator 140 may be disposed downstream of the second slurry reactor 130 and may be operable to separate the second reactor effluent 134 to produce a used mesoporous zeolite supported metal catalyst 144 and at least one product effluent 142 comprising aromatic compounds having six to eight carbon atoms, such as benzene, toluene, ethylbenzene, xylenes, or combinations of these (BTEX).

The present disclosure is also directed to methods for upgrading a pyrolysis oil feed 102. In particular, the methods may comprise contacting the pyrolysis oil feed 102 with hydrogen 104 in the presence of a mixed metal oxide catalyst 106 at reaction conditions to produce a first reactor effluent 114 comprising light aromatic compounds, passing an intermediate stream 122 comprising the light aromatic compounds to a second slurry reactor 130 downstream of the first slurry reactor 110, and contacting the intermediate stream 122 with hydrogen 132 in the presence of a mesoporous zeolite supported metal catalyst 126 at reaction conditions to produce at least one product effluent 142 comprising aromatic compounds having six to eight carbon atoms.

The various methods and systems of the present disclosure for upgrading pyrolysis oil may increase the yields of BTEX through a two stage catalytic process under mild conditions. Traditionally, pyrolysis oil has not been able to be upgraded to xylenes in a single processing step under mild conditions. Further, existing single step processes can be complex and can be insufficient to meet the demand of BTEX.

In the methods and systems of the present disclosure, the pyrolysis oil may be contacted with hydrogen in the presence of the mixed metal oxide catalyst to covert multi-ring aromatic compounds in the pyrolysis oil to light aromatic compounds comprising di-aromatic compounds, tri-aromatic compounds, or both, and then the light aromatic compounds may be contacted with hydrogen in the presence of the mesoporous zeolite supported metal catalyst to form aromatic compounds having six to eight carbon atoms, such as BTEX. These two stage catalytic processes may increase the yields of BTEX through a single process by using two slurry reactors in series under mild conditions.

As used in this disclosure, a "catalyst" may refer to any substance that increases the rate of a specific chemical reaction. Catalysts and catalyst components described in this disclosure may be utilized to promote various reactions, such as, but not limited to selective hydrogenation, ring opening, disproportionation, dealkylation, hydrodealkylation, transalkylation, cracking, aromatic cracking, other chemical reactions, or combinations of these.

As used in this disclosure, "cracking" may refer to a chemical reaction where a molecule having carbon-carbon bonds is broken into more than one molecule by the breaking of one or more of the carbon-carbon bonds; where a compound including a cyclic moiety, such as an aromatic, is converted to a compound that does not include a cyclic moiety; or where a molecule having carbon-carbon double bonds are reduced to carbon-carbon single bonds. Some catalysts may have multiple forms of catalytic activity, and calling a catalyst by one particular function does not render that catalyst incapable of being catalytically active for other functionality.

As used in this disclosure, the term "aromatic compounds" may refer to one or more compounds having one or more aromatic ring structures. The term "light aromatic compounds" may refer to one or more compounds having an aromatic ring, with or without substitution, and from six to eight carbon atoms. The term "BTEX" may refer to any combination of benzene, toluene, ethylbenzene, para-xylene, meta-xylene, and ortho-xylene.

As used in this disclosure, the term "xylenes," when used without a designation of the isomer, such as the prefix para, meta, or ortho, may refer to one or more of meta-xylene, ortho-xylene, para-xylene, and mixtures of these xylene isomers.

As used in this disclosure, the term "outer surfaces" may refer to surfaces at the outer periphery of a catalyst or catalyst support, such as the hierarchical mesoporous zeolite support.

As used in this disclosure, the term "pore surfaces" may refer to the inner surfaces of pores in a catalyst or catalyst support, where the pores include at least the pores in fluid communication with the outer surfaces of the catalyst or catalyst support and are accessible to reactants.

As used in this disclosure, the "average pore size" of a catalyst or catalyst support may refer to the average pore size determined by Barrett-Joyner-Halenda (BJH) analysis. BJH analysis measures the amount of a gas (argon) that detaches from a material, such as the hierarchical mesoporous zeolite support, at 87 Kelvin over a range of pressures. Using the Kelvin equation, the amount of argon adsorbate removed from the pores of the material and the relative pressure of the system can be used to calculate the average pore size of the material.

As used throughout the present disclosure, the terms "upstream" and "downstream" may refer to the relative positioning of unit operations with respect to the direction of flow of the process streams. A first unit operation of a system may be considered "upstream" of a second unit operation if process streams flowing through the system encounter the first unit operation before encountering the second unit operation. Likewise, a second unit operation may be considered "downstream" of the first unit operation if the process streams flowing through the system encounter the first unit operation before encountering the second unit operation.

As used in the present disclosure, passing a stream or effluent from one unit "directly" to another unit may refer to passing the stream or effluent from the first unit to the second unit without passing the stream or effluent through an intervening reaction system or separation system that substantially changes the composition of the stream or effluent. Heat transfer devices, such as heat exchangers, preheaters, coolers, condensers, or other heat transfer equipment, and pressure devices, such as pumps, pressure regulators, compressors, or other pressure devices, are not considered to be intervening systems that change the composition of a stream or effluent. Combining two streams or effluents together upstream of a process unit also is not considered to comprise an intervening system that changes the composition of one or both of the streams or effluents being combined. Simply dividing a stream into two streams having the same composition is also not considered to comprise an intervening system that changes the composition of the stream.

As used in this disclosure, a "separator" refers to any separation device that at least partially separates one or more chemicals that are mixed in a process stream from one another. For example, a separator may selectively separate differing chemical species from one another, forming one or more chemical fractions. Examples of separators include, without limitation, distillation columns, flash drums, knock-out drums, knock-out pots, centrifuges, filtration devices, traps, scrubbers, expansion devices, membranes, solvent extraction devices, and the like. It should be understood that separation processes described in this disclosure may not completely separate all of one chemical consistent from all of another chemical constituent. It should be understood that the separation processes described in this disclosure "at least partially" separate different chemical components from one another, and that even if not explicitly stated, it should be understood that separation may include only partial separation. As used in this disclosure, one or more chemical constituents may be "separated" from a process stream to form a new process stream. Generally, a process stream may enter a separator and be divided or separated into two or more process streams of desired composition. Further, in some separation processes, a "light fraction" and a "heavy fraction" may separately exit the separator. In general, the light fraction stream has a lesser boiling point than the heavy fraction stream. It should be additionally understood that where only one separator is depicted in a figure or described, two or more separators may be employed to carry out the identical or substantially identical separation. For example, where a distillation column with multiple outlets is described, it is contemplated that several separators arranged in series may equally separate the feed stream and such embodiments are within the scope of the presently described embodiments.

As used in this disclosure, the term "effluent" may refer to a stream that is passed out of a reactor, a reaction zone, or a separator following a particular reaction or separation process. Generally, an effluent has a different composition than the stream that entered the separator, reactor, or reaction zone. It should be understood that when an effluent is passed to another system unit, only a portion of that system stream may be passed. For example, a slip stream (having the same composition) may carry some of the effluent away, meaning that only a portion of the effluent may enter the downstream system unit. The term "reaction effluent" may more particularly be used to refer to a stream that is passed out of a reactor or reaction zone.

It should further be understood that streams may be named for the components of the stream, and the component for which the stream is named may be the major component of the stream (such as comprising from 50 weight percent (wt. %), from 70 wt. %, from 90 wt. %, from 95 wt. %, from 99 wt. %, from 99.5 wt. %, or even from 99.9 wt. % of the contents of the stream to 100 wt. % of the contents of the stream). It should also be understood that components of a stream are disclosed as passing from one system component to another when a stream comprising that component is disclosed as passing from that system component to another. For example, a disclosed "hydrogen stream" passing to a first system component or from a first system component to a second system component should be understood to equivalently disclose "hydrogen" passing to the first system component or passing from a first system component to a second system component.

Referring again to FIG. 1, a system 100 for upgrading pyrolysis oil feed 102 is schematically depicted. The system 100 for upgrading pyrolysis oil feed 102 may include a first slurry reactor 110, a first separator 120 downstream of the first slurry reactor 110, a second slurry reactor 130 downstream of the first separator 120, and a second separator 140 downstream of the second slurry reactor 130. The first slurry reactor 110 may include one or a plurality of reactors and may be operable to contact the pyrolysis oil feed 102 with hydrogen 104 in the presence of a catalyst to produce a first reactor effluent 114. The catalyst is the mixed metal oxide catalyst 106 of the present disclosure. The first reactor effluent 114 may be passed to the first separator 120, which may include one or a plurality of separation processes or unit operations. The first separator 120 may be operable to separate used mixed metal oxide catalyst 124 from the first reactor effluent 114 to produce an intermediate stream 122 and used mixed metal oxide catalyst 124. The intermediate stream 122 may comprise light aromatic compounds. In particular, the intermediate stream 122 may comprise di-aromatic compounds, tri-aromatic compounds, or both. The second slurry reactor 130 may be operable to contact the intermediate stream 122 with hydrogen 132 in the presence of the mesoporous zeolite supported metal catalyst 126 to produce a second reactor effluent 134. The second separator 140 may be operable to separate the second reactor effluent 134 to produce a used mesoporous zeolite supported metal catalyst 144 and at least one product effluent 142 comprising aromatic compounds having six to eight carbon atoms.

Figure 2:
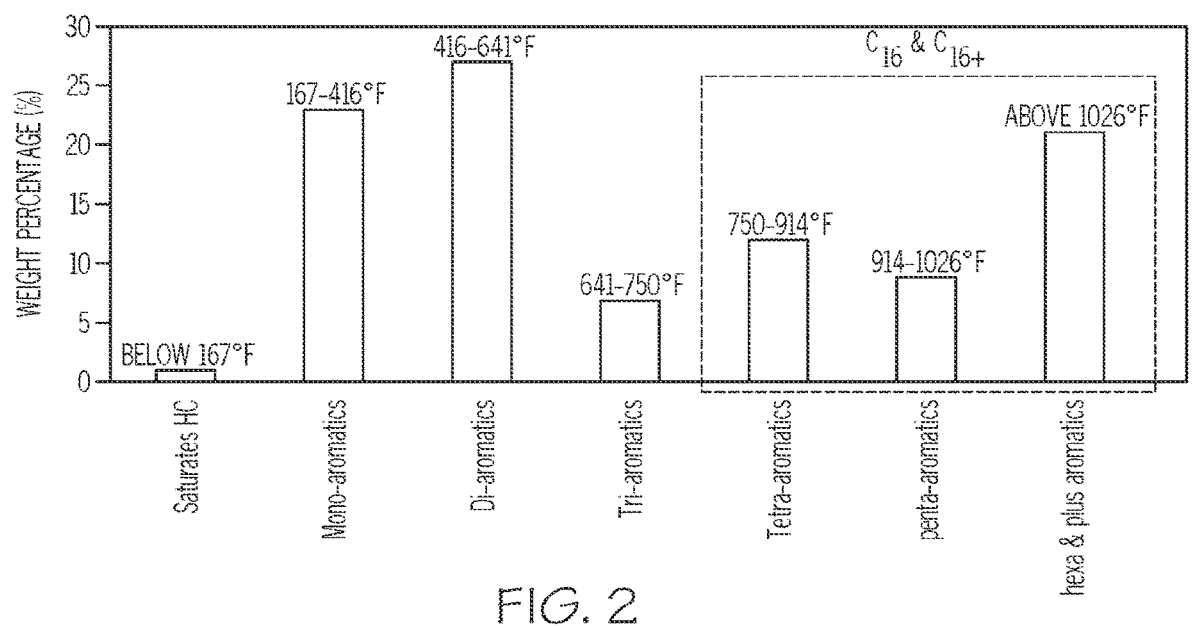
FIG. 2 graphically depicts weight percentage (y-axis) of various constituents (x-axis) present in a pyrolysis oil, according to one or more embodiments shown and described in this disclosure.

The pyrolysis oil feed 102 may include a pyrolysis oil. In embodiments, the pyrolysis oil feed 102 may also include a diluent. The pyrolysis oil may be a stream from a hydrocarbon processing facility that is rich in aromatic compounds, such as multi-ring aromatic compounds. In embodiments, the pyrolysis oil of the pyrolysis oil feed 102 may be a bottom stream from a steam cracking process. As used in the present disclosure, "bottom stream" may refer to a residuum or a fraction of the feed (such as the feed to a steam cracking process) including the least volatile constituents that have not been separately captured as condensed vapor. The pyrolysis oil of the pyrolysis oil feed 102 may include mono-aromatic compounds and multi-ring aromatic compounds. Multi-ring aromatic compounds may include aromatic compounds including 2, 3, 4, 5, 6, 7, 8, or more than 8 aromatic ring structures. Multi-ring aromatic compounds may include aromatic compounds including greater than or equal to sixteen carbon atoms. The pyrolysis oil of the pyrolysis oil feed 102 may also include other components, such as but not limited to saturated hydrocarbons. Referring to FIG. 2, the composition of a typical pyrolysis oil that can be used in the pyrolysis oil feed 102 is graphically depicted. The pyrolysis oil depicted in FIG. 2 is a pyrolysis oil produced from steam cracking crude oil from Saudi Arabia. As shown in FIG. 2, the pyrolysis oil of the pyrolysis oil feed 102 may include mono-aromatics, di-aromatics, tri-aromatics, tetra-aromatics, penta-aromatics, and aromatic compounds having 6 or more aromatic rings (hexa & plus aromatics in FIG. 2). The pyrolysis oil of the pyrolysis oil feed 102 may include elevated concentrations of di-aromatic compounds and aromatic compounds having greater than or equal to 6 aromatic rings, as indicated by FIG. 2. In embodiments, the pyrolysis oil of the pyrolysis oil feed 102 that is rich in multi-ring aromatic compounds may include greater than or equal to 50 wt. % multi-ring aromatic compounds, such as greater than or equal to 60 wt. %, greater than or equal to 65 wt. %, greater than or equal to 70 wt. %, greater than or equal to 75 wt. %, or even greater than or equal to 80 wt. % multi-ring aromatic compounds based on a unit weight of the pyrolysis oil in the pyrolysis oil feed 102.

A significant portion of the pyrolysis oil in the pyrolysis oil feed 102 may be multi-ring aromatic compounds having greater than 16 carbon atoms or four or more aromatic rings. The pyrolysis oil feed 102 may include greater than or equal to 30 wt. % multi-ring aromatic compounds having greater than or equal to sixteen carbon atoms, such as greater than or equal to 35 wt. %, greater than or equal to 40 wt. %, or even greater than or equal to 45 wt. % multi-ring aromatic compounds having greater than or equal to sixteen carbon atoms, where the weight percent is based on the unit weight of the pyrolysis oil in the pyrolysis oil feed 102. The pyrolysis oil feed 102 may include greater than or equal to 30 wt. % multi-ring aromatic compounds having a boiling point temperature greater than or equal to 750 degrees Fahrenheit (° F.) (399° C.), such as greater than or equal to 35 wt. %, greater than or equal to 40 wt. %, or even greater than or equal to 45 wt. % multi-ring aromatic compounds having a boiling point temperature greater than or equal to 399° C., where the weight percent is based on the unit weight of the pyrolysis oil in the pyrolysis oil feed 102. The pyrolysis oil of the pyrolysis oil feed 102 may also have a low concentration of sulfur and sulfur compounds. The pyrolysis oil feed 102 may have a concentration of sulfur and sulfur-containing compounds of less than or equal to 500 parts per million by weight (ppmw), such as less than or equal to 400 ppmw, or even less than or equal to 300 ppmw.

As previously discussed, in embodiments, the pyrolysis oil feed 102 may include a diluent. Due to the high viscosity of the pyrolysis oil feed 102, the diluent may be added to increase the fluidity of the pyrolysis oil feed 102. The inclusion of the diluent in the pyrolysis oil feed 102 may allow the pyrolysis oil feed 102 to have increased contact with the surfaces of the mixed metal oxide catalyst 106 in the first slurry reactor 110. The diluent may include but is not limited to benzene, mixed xylenes, toluene, or combinations of these. In embodiments, the diluent may be toluene due to the greater solubility of pyrolysis oils in toluene compared to benzene and xylenes. The pyrolysis oil feed 102 may include from 10 wt. % to 90 wt. % diluent based on the total weight of the pyrolysis oil feed 102. The pyrolysis oil feed 102 may include from 10 wt. % to 80 wt. %, from 10 wt. % to 70 wt. %, from 10 wt. % to 60 wt. %, from 30 wt. % to 90 wt. %, from 30 wt. % to 80 wt. %, from 30 wt. % to 70 wt. %, from 30 wt. % to 60 wt. %, from 50 wt. % to 90 wt. %, from 50 wt. % to 80 wt. %, from 50 wt. % to 70 wt. %, from 60 wt. % to 90 wt. %, from 60 wt. % to 80 wt. %, or from 70 wt. % to 90 wt. % diluent based on the total weight of the pyrolysis oil feed 102. In embodiments, pyrolysis oil may be mixed with the diluent in a mixing unit upstream of the first slurry reactor 110 to produce the pyrolysis oil feed 102, which may then be passed to the first slurry reactor 110. In embodiments, the pyrolysis oil feed 102 may not include a diluent added to the pyrolysis oil immediately upstream of the first slurry reactor 110. However, in these embodiments, the pyrolysis oil feed 102 may still include small amounts, such as less than 10 wt. %, toluene, xylene, or benzene that may be carried through from the process producing the pyrolysis oil.

Referring again to FIG. 1, the pyrolysis oil feed 102 may be passed to the first slurry reactor 110. The first slurry reactor 110 may be operable to contact the pyrolysis oil feed 102 with hydrogen 104 in the presence of the mixed metal oxide catalyst 106 to produce the first reactor effluent 114. Contacting the pyrolysis oil feed 102 with hydrogen 104 in the presence of the mixed metal oxide catalyst 106 may convert at least a portion of the multi-ring aromatic compounds in the pyrolysis oil feed 102 to light aromatic compounds. The hydrogen 104 may include a recycled hydrogen stream or supplemental hydrogen from an external hydrogen source inside or outside the battery limits of the refinery. The hydrogen 104 may be passed directly to the first slurry reactor 110 or may be combined with the pyrolysis oil feed 102 upstream of the first slurry reactor 110. The hydrogen 104 may be used to pressurize the first slurry reactor 110 to the operating pressure.

The first slurry reactor 110 may include any type of reactor suitable for contacting the pyrolysis oil feed 102 with hydrogen 104 in the presence of the mixed metal oxide catalyst 106. In embodiments, the first slurry reactor 110 may comprise a slurry phase reactor. The term "slurry phase reactor" refers to a 3-phase reactor in which a solid phase, liquid phase, and gaseous phase are reacted simultaneously. The slurry phase reactor may include the mixed metal oxide catalyst 106 suspended in the liquid of the pyrolysis oil feed 102 to form the reaction slurry, and the hydrogen may be permeated or bubbled up through the reaction slurry. The slurry phase reactor may be a batch slurry phase reactor or a continuous slurry phase reactor. When the first slurry reactor 110 comprises a batch slurry phase reactor, the pyrolysis oil feed 102 and the mixed metal oxide catalyst 106 may be charged to the slurry phase reactor, the slurry reactor sealed, and the hydrogen gas percolated through the reaction slurry in the slurry phase reactor. In embodiments, the first slurry reactor 110 may comprise one or a plurality of batch slurry phase reactors. When the first slurry reactor 110 comprises a plurality of slurry phase reactors, the plurality of slurry phase reactors may be operated in series, in parallel, or a combination thereof. In embodiments, the first slurry reactor 110 may include a plurality of batch slurry phase reactors in parallel and the plurality of batch slurry phase reactors may be operated so in a staggered manner to approximate continuous operation of the slurry phase reactor.

The mixed metal oxide catalyst 106 may be catalytically active to convert multi-ring aromatic compounds having greater than or equal to sixteen carbon atoms in the pyrolysis oil feed 102 to light aromatic compounds. The mixed metal oxide catalyst 106 may include a plurality of catalyst particles. Each of the plurality of catalyst particles may include a plurality of metal oxides that are different from one another. The plurality of metal oxides of the mixed metal oxide catalyst 106 may include oxides of metals in groups 3-13 of the International Union of Pure and Applied Chemistry (IUPAC) periodic table. In embodiments, the plurality of metal oxides of the mixed metal oxide catalyst 106 may include combinations of oxides of iron, zirconium, cerium, aluminum, tungsten, molybdenum, and titanium. The mixed metal oxide catalyst 106 may also include oxides of metalloids, such as oxides of silicon. The mixed metal oxide catalyst 106 may comprise oxides of metals or metalloids selected from the group consisting of iron oxide ($Fe_2O_3$), zirconium oxide ($ZrO_2$), cerium oxide ($CeO_2$), aluminum oxide (alumina) ($Al_2O_3$), silica ($SiO_2$), tungsten oxide ($WO_3$), molybdenum oxide ($MoO_3$), titanium oxide ($TiO_2$), and combinations of these.

The mixed metal oxide catalyst 106 may include iron oxide as one of the plurality of metal oxides. In embodiments, the mixed metal oxide catalyst 106 may include from 60 wt. % to 95 wt. % iron oxide, such as from 70 wt. % to 90 wt. %, from 75 wt. % to 85 wt. %, or from 80 wt. % to 85 wt. % iron oxide. The mixed metal oxide catalyst 106 may include zirconium oxide as one of the plurality of metal oxides. In embodiments, the mixed metal oxide catalyst 106 may include from 1 wt. % to 20 wt. % zirconium oxide, such as from 1 wt. % to 15 wt. %, from 2.5 wt. % to 12.5 wt. %, or from 5 wt. % to 10 wt. % zirconium oxide. The mixed metal oxide catalyst 106 may include cerium oxide as one of the plurality of metal oxides. In embodiments, the mixed metal oxide catalyst 106 may include from 0.1 wt. % to 10 wt. % cerium oxide, such as from 0.5 wt. % to 7.5 wt. %, from 0.5 wt. % to 5 wt. %, or from 1 wt. % to 5 wt. %. The mixed metal oxide catalyst 106 may include aluminum oxide (alumina) as one of the plurality of metal oxides. In embodiments, the mixed metal oxide catalyst 106 may include from 1 wt. % to 20 wt. % aluminum oxide (alumina), such as from 2.5 wt. % to 15 wt. %, from 3 wt. % to 12.5 wt. %, or from 5 wt. % to 10 wt. %. The weight percentages of the plurality of metal oxides of the mixed metal oxide catalyst 106 are based on the total weight of the mixed metal oxide catalyst 106. The mixed metal oxide catalyst 106 may comprise, consist of, or consist essentially of from 60 wt. % to 95 wt. % iron oxide, from 1 wt. % to 20 wt. % zirconium oxide, from 0.1 wt. % to 10 wt. % cerium oxide, and from 1 wt. % to 20 wt. % aluminum oxide (alumina). In embodiments, the mixed metal oxide catalyst 106 may include 83 wt. % iron oxide, 7.5 wt. % zirconium oxide, 2.5 wt. % cerium oxide, and 7.0 wt. % aluminum oxide (alumina). In embodiments, the mixed metal oxide catalyst 106 does not include silica. In embodiments, the mixed metal oxide catalyst 106 may include the plurality of metal oxides mixed and fused or agglomerated together to form the catalyst particles comprising a homogeneous solid mixture of the metal oxides instead of one or more metal oxides deposited on a surface of a support material. The mixed metal oxide catalyst may be prepared by a co-precipitation method to produce the catalyst particles comprising each of the plurality of different metal oxides distributed throughout the catalyst particle.

Contacting the pyrolysis oil feed 102 with hydrogen 104 in the presence of the mixed metal oxide catalyst 106 at the reaction conditions in the first slurry reactor 110 may convert at least a portion of the multi-ring aromatic compounds in the pyrolysis oil feed 102 to the light aromatic compounds in a single step, without conducting a subsequent chemical reaction step. Converting at least a portion of the multi-ring aromatic compounds to light aromatic compounds comprising di-aromatic compounds, tri-aromatic compounds, or both, is a complicated reaction scheme comprising multiple synchronized and selective reactions, which may include selective hydrogenation of one aromatic ring in a compound but not all, subsequent ring opening of the saturated tetra-aromatic compounds, hydro-dealkylation, transalkylation, and disproportionation reactions. Not intending to be bound by any particular theory, it is believed that upgrading the pyrolysis oil feed 102 may include selective hydrogenation of at least one aromatic ring structure or a multi-ring aromatic compound to produce a molecule with one or more aromatic rings and at least one saturated ring. The saturated ring portion may then undergo ring opening to produce a substituted aromatic compound. The substituted aromatic may then undergo one or more of hydroalkylation, transalkylation, or disproportionation to produce light aromatic compounds. It is understood that multiple variations and combinations of these reactions as well as other chemical reactions may occur during the upgrading process. This complex sequence of synchronized reactions for upgrading pyrolysis oil feed 102 may be catalyzed using the mixed metal oxide catalyst 106.

The first slurry reactor 110 may contact the pyrolysis oil feed 102 with hydrogen 104 in the presence of the mixed metal oxide catalyst 106 at mild operating conditions sufficient to cause at least a portion of multi-ring aromatic compounds in the pyrolysis oil feed 102 to be upgraded to produce a first reactor effluent 114, where the first reactor effluent 114 comprises light aromatic compounds. The first slurry reactor 110 may be operated at an operating temperature in the range of from 300 degrees Celsius (° C.) to 500° C., such as from 350° C. to 500° C., from 400° C. to 500° C., from 300° C. to 450° C., from 350° C. to 450° C., or from 400° C. to 450° C., The first slurry reactor 110 may be operated at an operating pressure of from 1 megapascal (MPa) (10 bar) to 20 MPa (200 bar), such as from 3 MPa (30 bar) to 20 MPa (200 bar), from 5 MPa (50 bar) to 20 MPa (200 bar), from 7 MPa (70 bar) to 20 MPa (200 bar), from 10 MPa (100 bar) to 20 MPa (200 bar), from 1 MPa (10 bar) to 15 MPa (150 bar), from 3 MPa (30 bar) to 15 MPa (150 bar), from 5 MPa (50 bar) to 15 MPa (150 bar), from 7 MPa (70 bar) to 15 MPa (150 bar), or from 10 MPa (100 bar) to 15 MPa (150 bar). The first slurry reactor 110 may be operated at volume ratio of hydrogen to the pyrolysis oil feed 102 of from 500 to 1500, from 500 to 1400, from 500 to 1300, from 500 to 1200, from 800 to 1500, from 800 to 1400, from 800 to 1300, or from 800 to 1200.

The first slurry reactor 110 may include one or more vapor outlets 105 operable to pass gaseous constituents out of the first slurry reactor 110 as a gaseous constituent effluent 107. The one or more vapor outlets 105 may be operable to separate the gaseous constituent effluent 107 from the first reactor effluent 114 after contacting the pyrolysis oil feed 102 with hydrogen 104 in the presence of the mixed metal oxide 106. The gaseous constituents of the gaseous constituent effluent 107 may include, but are not limited to, excess hydrogen 104, light hydrocarbons (e.g., methane, ethane, etc.), sulfur components (e.g., hydrogen sulfide ($H_2S$)), or combinations of these. The gaseous constituent effluent 107 may include at least 90%, at least 95%, at least 98%, at least 99%, or even at least 99.9% by weight of the gaseous constituents produced in the first slurry reactor 110 after upgrading the pyrolysis oil feed 102, where the gaseous constituents generally refers to compounds that are gases at the reaction conditions in the first slurry reactor 110. The gaseous constituent effluent 107 may also include excess hydrogen 104. The gaseous constituent effluent 107 may be passed to one or more downstream treatment processes, such as but not limited to processes for recovering any light hydrocarbon compounds from the gaseous constituent effluent 107, separation of excess hydrogen, removal of one or more contaminants, or other process.

The first slurry reactor 110 may be in fluid communication with the first separator 120 to pass the first reactor effluent 114 from the first slurry reactor 110 directly to the first separator 120. The first reactor effluent 114 may comprise light aromatic compounds. The light aromatic compounds may include di-aromatic compounds, tri-aromatic compounds, or both. The first reactor effluent 114 may include at least 90%, at least 95%, at least 98%, at least 99%, or even at least 99.9% by weight of the light aromatic compounds produced in the first slurry reactor 110. The first reactor effluent 114 may also include the mixed metal oxide catalyst 106 and any unreacted constituents of the pyrolysis oil feed 102, such as unreacted heavy aromatic compounds.

Referring again to FIG. 1, the first reactor effluent 114 may be passed to the first separator 120. The first separator 120 may be directly downstream of the first slurry reactor 110 so that the first reactor effluent 114 can be passed directly from the first slurry reactor 110 to the first separator 120 without passing through any intervening reactors or unit operations. The first separator 120 may include one or a plurality of separators. The first separator 120 may be operable to separate the first reactor effluent 114 into at least the intermediate stream 122 and used mixed metal oxide catalyst 124. The first separator 120 may include a solid-liquid separation device operable to separate the first reactor effluent 114 into at least one intermediate stream 122 and the used mixed metal oxide catalyst 124. The first separator 120 may include a vacuum distillation column. In embodiments, the first separator 120 may include a centrifuge. The first separator 120 may be operable to separate the first reactor effluent 114 by centrifugation into at least the intermediate stream 122 and the used mixed metal oxide catalyst 124. Other solid/liquid separation devices, such as but not limited to filters, settling tanks, cyclonic or separation devices, are contemplated.

Although the first separator 120 is depicted in FIG. 1 as separating the first reactor effluent 114 into an intermediate stream 122 comprising light aromatic compounds and the used mixed metal oxide catalyst 124, it is understood that the first separator 120 may be operable to further separate the first reactor effluent 114 into a plurality of reaction product effluents, one or more of which may include light aromatic compounds. In embodiments, the first separator 120 may include a solid-liquid separator and a distillation unit, vacuum distillation unit, or fractionation unit downstream of the solid-liquid separator. The distillation unit, vacuum distillation unit, or fractionation unit may be operable to separate the liquid effluent from the solid-liquid separator into the intermediate stream 122 and one or more other effluents, such as but not limited to one or more product effluents, a first slurry reactor bottom stream, or combinations of these. The intermediate stream 122 may be passed out of the first separator 120 to the second slurry reactor 130.

Referring again to FIG. 1, the used mixed metal oxide catalyst 124 may be recycled back to the first slurry reactor 110. The used mixed metal oxide catalyst 124 may be recycled back to the first slurry reactor 110 through a used mixed metal oxide catalyst recycle line. The used mixed metal oxide catalyst recycle line may be fluidly coupled to an outlet of the first separator 120 and an inlet of the first slurry reactor 110. In embodiments, the used mixed metal oxide catalyst recycle line may include a catalyst storage vessel. In embodiments, the used mixed metal oxide catalyst may be further treated to increase or restore catalyst activity prior to recycling the used mixed metal oxide catalyst back to the first slurry reactor 110. In embodiments, the used mixed metal oxide catalyst 124 may be passed from the first separator 120 to the first slurry reactor 110.

Figure 4:
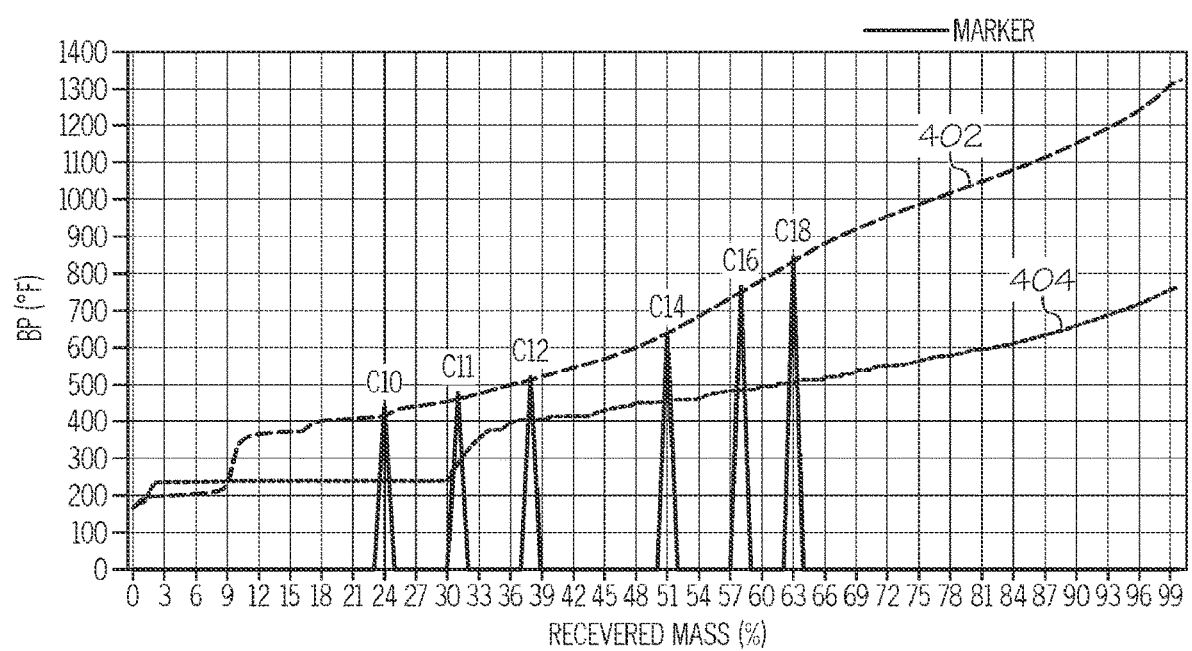
FIG. 4 graphically depicts a boiling point distribution of intermediate stream produced from Example 3, according to one or more embodiments shown and described in this disclosure.

Referring to FIGS. 1 and 4, the intermediate stream 122 may include di-aromatic compounds. Referring now to FIG. 4, boiling point distributions for the pyrolysis oil of the pyrolysis oil feed 102 and the intermediate stream 122 from the first slurry reactor 110 are graphically depicted. The boiling point distribution for the pyrolysis oil is indicated by reference number 402 in FIG. 4, and the boiling point distribution for the intermediate stream is indicated by reference number 404. Markers indicating the boiling point temperatures for C10 to C18 aromatic compounds is also shown in FIG. 4 for reference. As shown in FIG. 4, the boiling point range for C10 to C18 aromatic compounds is from around 400 degrees Fahrenheit (° F.) to around 850° F. As shown in FIG. 4, the intermediate stream 122 may include a greater percentage of di-aromatic compounds comprising 10 to 18 carbon atoms compared to the pyrolysis oil of the pyrolysis oil feed 102. The intermediate stream 122 may include at least 35%, at least 40%, at least 45%, at least 50%, or even at least 55% by weight di-aromatic compounds having from 10 to 18 carbon atoms (C10 to C18 aromatic compounds) based on the total weight of the intermediate stream 122, including any diluent added to the pyrolysis oil feed 102 and passed through the first slurry reactor 110. The linear part in the intermediate stream curve shown in FIG. 4 may include toluene added to the pyrolysis oil as the diluent to produce the pyrolysis oil feed 102, but may also include any toluene, benzene, xylene, or ethylbenzene produced in the first slurry reactor 110. Di-aromatic compounds included the intermediate stream 122 may be passed to the second slurry reactor 130 and then hydrocracked to produce BTEX. The second slurry reactor 130 may increase the yields of BTEX and reduce recycle of unreacted pyrolysis oil feed 102 back through the process.

The intermediate stream 122 may be passed downstream to the second slurry reactor 130. The second slurry reactor 130 may be operable to contact the intermediate stream 122 with hydrogen 132 in the presence of the mesoporous zeolite supported metal catalyst 126 to produce a second reactor effluent 134. Contacting the intermediate stream 122 with hydrogen 132 in the presence of the mesoporous zeolite supported metal catalyst 126 may cause at least a portion of the light aromatic compounds in the intermediate stream 122 to react to form aromatic compounds having six to eight carbon atoms. The hydrogen 132 may include a recycled hydrogen stream or supplemental hydrogen from an external hydrogen source inside or outside the battery limits of the refinery. The hydrogen 132 may be passed directly to the second slurry reactor 130 or may be combined with the intermediate stream 122 upstream of the second slurry reactor 130. The hydrogen 132 may be used to pressurize the second slurry reactor 130 to the operating pressure.

The second slurry reactor 130 may include any type of reactor suitable for contacting the intermediate stream 122 with hydrogen 132 in the presence of the mesoporous zeolite supported metal catalyst 126. In embodiments, the second slurry reactor 130 may comprise a slurry phase reactor. The term "slurry phase reactor" refers to a 3-phase reactor in which a solid phase, liquid phase, and gaseous phase are reacted simultaneously. The slurry phase reactor may include the mesoporous zeolite supported metal catalyst 126 suspended in the liquid of the intermediate stream 122 to form the reaction slurry, and the hydrogen may be permeated or bubbled up through the reaction slurry. The slurry phase reactor may be a batch slurry phase reactor or a continuous slurry phase reactor. When the second slurry reactor 130 comprises a batch slurry phase reactor, the intermediate stream 122 and the mesoporous zeolite supported metal catalyst 126 may be charged to the slurry phase reactor, the slurry reactor sealed, and the hydrogen gas percolated through the reaction slurry in the slurry phase reactor. In embodiments, the second slurry reactor 130 may comprise one or a plurality of batch slurry phase reactors. When the second slurry reactor 130 comprises a plurality of slurry phase reactors, the plurality of slurry phase reactors may be operated in series, in parallel, or a combination thereof. In embodiments, the second slurry reactor 130 may include a plurality of batch slurry phase reactors in parallel and the plurality of batch slurry phase reactors may be operated so in a staggered manner to approximate continuous operation of the slurry phase reactor.

The mesoporous zeolite supported metal catalyst 126 may be operable to cause at least a portion of the light aromatic compounds in the intermediate stream 122 to react to form aromatic compounds having six to eight carbon atoms (BTEX). The mesoporous zeolite supported metal catalyst 126 may include a first metal catalyst and a second metal catalyst supported on a mesoporous zeolite support.

The mesoporous zeolite support may have an average pore size sufficient to enable multi-ring aromatic compounds to access reactive sites within the pores of the mesoporous zeolite support. The mesoporous zeolite support may have an average pore size of greater than or equal to 2 nanometers (nm), greater than or equal to 5 nm, or even greater than or equal to 8 nm as determined using the Barrett-Joyner-Halenda (BJH) method. The mesoporous zeolite support may have an average pore size less than or equal to 40 nm, less than or equal to 30 nm, or even less than or equal to 25 nm as determined using the BJH method. In embodiments, the mesoporous zeolite support may have an average pore size of from 2 nm to 40 nm, from 2 nm to 30 nm, from 2 nm to 25 nm, from 5 nm to 40 nm, from 5 nm to 30 nm, from 5 nm to 25 nm, from 8 nm to 40 nm, from 8 nm to 30 nm, or from 8 nm to 25 nm, where the average pore size is determined using the BJH method. In embodiments, the mesoporous zeolite support may be the hierarchical mesoporous zeolite support.

The mesoporous zeolite support may have a molar ratio of silica ($SiO_2$) to alumina ($Al_2O_3$) of greater than or equal to 10, such as greater than or equal to 20, greater than or equal to 30, greater than or equal to 40, greater than or equal to 50, or greater than or equal to 60. The zeolite support may have a molar ratio of $SiO_2$ to $Al_2O_3$ of less than or equal to 70, such as less than or equal to 60, less than or equal to 50, less than or equal to 40, less than or equal to 30, or even less than or equal to 20. The zeolite support may have a molar ratio of $SiO_2$ to $Al_2O_3$ of from 10 to 70. In embodiments, the zeolite support may have a molar ratio of $SiO_2$ to $Al_2O_3$ of from 10 to 60, from 10 to 50, from 10 to 40, from 20 to 70, from 20 to 60, from 20 to 50, from 20 to 40, from 30 to 70, from 30 to 60, from 30 to 50, from 40 to 70, from 40 to 60, from 50 to 70, or from 10 to 30. In embodiments, the mesoporous zeolite support may be a hierarchical mesoporous beta zeolite support. In embodiments, the hierarchical mesoporous beta zeolite support may have an average pore size of 2 nm to 40 nm, or from 5 nm to 25 nm.

In embodiments, the mesoporous zeolite support may be a hierarchical mesoporous zeolite support prepared from a parent microporous zeolite through a desilication process, in which silica may be removed from the zeolite to create a mesoporous structure and increase the average pore size. A desilication method of preparing the hierarchical mesoporous zeolite support may include providing a microporous parent zeolite with a silica to alumina ($SiO_2/Al_2O_3$) ratio of at least 5 or greater than or equal to 20, mixing the microporous parent zeolite with an aqueous metal hydroxide solution, and heating the microporous parent zeolite and aqueous metal hydroxide mixture to temperatures greater than or equal to 100° C. to produce the mesoporous zeolite supports having an average pore size greater than 2 nm, greater than or equal to 5 nm, or even greater than or equal to 8 nm as determined using the BJH method. In embodiments, the mesoporous zeolite supports may be produced without a templating agent or a pore-directing agent.

As used in the present disclosure, microporous zeolites refer to zeolite particles that have an average pore size of less than 2 nm, such as less than 1 nm as determined using the BJH method. The microporous zeolites may have an average particle size, as measured by their longest dimension, of less than or equal to 10 micrometer (μm), less than or equal to 8 μm, less than or equal to 6 μm, less than or equal to 4 μm, less than or equal to 2 μm, or less than or equal to 1 μm. The microporous zeolites may have an average particle size, as measured by their longest dimension, of greater than or equal to 0.1 μm, greater than or equal to 0.2 μm, or greater than or equal to 0.5 μm. In embodiments, the microporous parent zeolite particles are present as a single crystal structure. The microporous parent zeolites may have an average particle size from 0.1 μm to 10 μm, from 0.1 μm to 8 μm, from 0.1 μm to 6 μm, from 0.1 μm to 4 μm, from 0.1 μm to 2 μm, from 0.1 mm to 1 μm, from 0.2 μm to 10 μm, from 0.2 μm to 8 μm, from 0.2 μm to 6 μm, from 0.2 μm to 4 μm, from 0.2 μm to 2 μm, from 0.2 mm to 1 μm, from 0.5 μm to 10 μm, from 0.5 μm to 8 μm, from 0.5 μm to 6 μm, from 0.5 μm to 4 μm, from 0.5 μm to 2 μm, or from 0.5 mm to 1 μm. The average particle size of a zeolite may refer to the average value of the particle size of all the particles of a zeolite in a given sample. In embodiments, the microporous parent zeolite may have a molar ratio of silica to alumina ($SiO_2/Al_2O_3$) of at least 5, at least 15, at least 20, at least 25, at least 30, or even at least 35. In embodiments, the microporous parent zeolite may have a molar ratio of silica to alumina of from 5 to 100, from 5 to 90, from 5 to 80, from 20 to 100, from 20 to 90, from 20 to 80, from 20 to 70, from 20 to 66, from 25 to 100, from 25 to 90, from 25 to 80, from 25 to 70, from 25 to 66, from 30 to 100, from 30 to 90, from 30 to 80, from 30 to 70, from 30 to 66, from 35 to 100, from 35 to 90, from 35 to 80, from 35 to 70, or even from 35 to 66. In embodiments, the microporous parent zeolite may be a beta zeolite.

Although a desilication method for producing the mesoporous zeolite support is described in detail, it is understood that any other process known in the art may also be used to produce the mesoporous zeolite support. Methods for producing mesoporous zeolite supports may include, but are not limited to, other "top down" methods conducted at temperatures less than 100° C., which may include utilizing pore-directing agents to facilitate formation of mesoporous. "Top down" methods may refer to methods in which a parent zeolite is chemically eroded to produce the mesoporous structure. Another method for producing mesoporous zeolite supports may include "bottom up" methods, which including building up the mesoporous zeolite from zeolite precursors. In the "bottom up" methods, templating agents are included and the zeolite is built-up around the templating agents to form the mesoporous structure. The resulting zeolite is then calcined to burn off the templating agent to produce the mesoporous zeolite support. Other synthesis methods may also be used to produce the mesoporous zeolite.

The mesoporous zeolite supported metal catalyst 126 may be prepared from the mesoporous zeolite support by wet impregnation of at least a first metal catalyst precursor and a second metal catalyst precursor onto the outer surfaces, pore surfaces, or both, of the mesoporous zeolite support.

As previously described, the mesoporous zeolite supported metal catalyst 126 may include the first metal catalyst and the second metal catalyst supported on the mesoporous zeolite support. At least one of the first metal catalyst and the second metal catalyst may include a heteropolyacid. The heteropolyacid may include at least one metal selected from cobalt, molybdenum, vanadium, or combinations thereof, and at least one heteroatom selected from phosphorous (P), silicon (Si), arsenic (As), germanium (Ge), or combinations of these. The heteropolyacid may also include oxygen. Heteropolyacids suitable for the first metal catalyst, the second metal catalyst, or both may have a Keggin structure having general formula $XM_{12}O_{40}{}^{n-}$ or a Dawson structure having the general formula $XM_{18}O_{82}{}^{n-}$, in which X is the heteroatom selected from phosphorous, silicon, arsenic, germanium, or combinations of these; M is the molybdenum and optionally one or more of cobalt, vanadium, or a combination of these; and n– is an integer indicative of the charge of the anion of the heteropolyacid. Examples of heteropolyacids may include, but are not limited to phosphormolybdic heteropolyacid ($H_3PMo_{12}O_{40}$), decamolybdiccobaltate heteropolyacid ($H_6[Co_2Mo_{10}O_{38}H_4]$), silicomolybdic heteropolyacid ($H_4SiMo_{12}O_{40}$), $H_4[PCoMo_{11}O_{40}]$, $H_4[PVMo_{11}O_{40}]$, $H_5[PV_2Mo_{10}O_{40}]$, $H_7[PV_4Mo_8O_{40}]$, $H_9[PV_6Mo_6O_{40}]$, $H_3[AsMo_{12}O_{40}]$, $H_4[AsCoMo_{11}O_{40}]$, $H_5[AsCo_2Mo_{10}O_{40}]$, $H_4[AsVMo_{11}O_{40}]$, $H_5[AsV_2Mo_{10}O_{40}]$, $H_7[AsV_4Mo_8O_{40}]$, $H_9[AsV_6Mo_6O_{40}]$, $H_5[SiCoMo_{11}O_{40}]$, $H_6[SiCo_2Mo_{10}O_{40}]$, $H_5[SiVMo_{11}O_{40}]$, $H_6[SiV_2Mo_{10}O_{40}]$, $H_{10}[SiV_6Mo_6O_{40}]$, $H_6[P_2Mo_{18}O_{82}]$, other heteropolyacids, salts of these heteropolyacids, or combinations of heteropolyacids. Salts of these heteropolyacids may include alkali metal salts, alkaline earth metal salts, nitrate salts, sulfate salts, or other salts of the heteropolyacid. Alkali metals may include sodium, potassium, rubidium, cesium, or combinations of these. Alkaline earth metals may include, but are not limited to magnesium, calcium, or combinations of these. In embodiments, the heteropolyacid may include phosphormolybdic heteropolyacid having formula $H_3[PMo_{12}O_{40}]$. In embodiments, the heteropolyacid may include decamolybdodicobaltate heteropolyacid having chemical formula $H_6[Co_2Mo_{10}O_{38}H_4]$. In embodiments, the heteropolyacid may be silicomolybdic heterpolyacid having chemical formula $H_4[SiMo_{12}O_{40}]$. In embodiments, the first metal catalyst, the second catalyst, or both may be a metal salt of a heteropolyacid, such as an alkali metal salt or alkaline metal salt of the heteropolyacid.

Still referring to FIG. 1, the first metal catalyst, the second metal catalyst, or both may be a heteropolyacid. In embodiments, the first metal catalyst may include a heteropolyacid, and the second metal catalyst may include a non-heteropolyacid. In embodiments, both the first metal catalyst and the second metal catalyst may include heteropolyacids. In embodiments, the first metal catalyst may include a first heteropolyacid, and the second metal catalyst may include a second heteropolyacid that is different from the first heteropolyacid. For example, in embodiments, the first metal catalyst may include a first heteropolyacid that includes molybdenum as the metal, and the second metal catalyst may include a second heteropolyacid that includes cobalt as the metal. In embodiments, the first metal catalyst and the second metal catalyst may include the same heteropolyacid, and the heteropolyacid may include a first metal, a second metal that is different from the first metal, and at least one heteroatom. In embodiments, the mesoporous zeolite supported metal catalyst 126 may include from 0 wt. % to 25 wt. % molybdenum and from 0 wt. % to 10 wt. % of cobalt, such as from 0.01 wt. % to 25 wt. % molybdenum and from 0.01 wt. % to 10 wt. % cobalt, based on the total weight of the mesoporous zeolite supported metal catalyst 126. The mesoporous zeolite supported metal catalyst 126 may include from 11 wt. % to 13 wt. % molybdenum and from 3 wt. % to 4 wt. % cobalt based on the total weight of the mesoporous zeolite supported metal catalyst 126.

The mesoporous zeolite supported metal catalyst 126 may further include phosphorous. The phosphorous may be provided by the heteropolyacids used to provide the first metal catalyst, the second metal catalyst, or both. Alternatively or additionally, the phosphorous may be provided by separate phosphorous-containing compound, such as but not limited to phosphoric acid, phosphorous acid, or other phosphorous-containing compounds, which may be added during synthesis of the mesoporous zeolite supported metal catalyst 126.

Contacting the intermediate stream 122 with hydrogen 132 in the presence of the mesoporous zeolite supported metal catalyst 126 at the reaction conditions may cause at least a portion of the light aromatic compounds in the intermediate stream 122 to react to form aromatic compounds having six to eight carbon atoms in a single step, without conducting a subsequent chemical reaction step. Converting at least a portion of the light aromatic compounds in the intermediate stream to aromatic compounds having six to eight carbon atoms is also a complicated reaction scheme comprising multiple synchronized and selective reactions, which may include selective hydrogenation of one aromatic ring in a compound but not all, subsequent ring opening of the saturated naphthenic ring, hydro-dealkylation, transalkylation, and disproportionation reactions. Not intending to be bound by any particular theory, it is believed that upgrading intermediate stream 122 may include selective hydrogenation of at least one aromatic ring structure of a multi-ring aromatic compound, such as the di-aromatic compounds in the intermediate stream 122, to produce a molecule with one aromatic ring and at least one saturated rings. The saturated rings may then undergo ring opening to produce substituted aromatic compounds. The substituted aromatic may then undergo one or more of hydroalkylation, transalkylation, or disproportionation to produce the aromatic compounds having 6 to 8 carbon atoms, such as BTEX. It is understood that multiple variations and combinations of these reactions as well as other chemical reactions may occur during the upgrading process in the second slurry reactor 130 as well. This complex sequence of synchronized reactions for upgrading intermediate stream 122 may be catalyzed using the mesoporous zeolite supported metal catalyst 126.

The second slurry reactor 130 may contact the intermediate stream 122 with hydrogen 132 in the presence of the mesoporous zeolite supported metal catalyst 126 at mild operating conditions sufficient to cause at least a portion of the light aromatic compounds in the intermediate stream 122 to react to form aromatic compounds having six to eight carbon atoms. The second slurry reactor 130 may be operated at an operating temperature in the range of from 300° C. to 500° C., such as from 350° C. to 500° C., from 400° C. to 500° C., from 300° C. to 450° C., from 350° C. to 450° C., or from 400° C. to 450° C., The second slurry reactor 130 may be operated at an operating pressure of from 1 MPa (10 bar) to 20 MPa (200 bar), such as from 3 MPa (30 bar) to 20 MPa (200 bar), from 5 MPa (50 bar) to 20 MPa (200 bar), from 7 MPa (70 bar) to 20 MPa (200 bar), from 10 MPa (100 bar) to 20 MPa (200 bar), from 1 MPa (10 bar) to 15 MPa (150 bar), from 3 MPa (30 bar) to 15 MPa (150 bar), from 5 MPa (50 bar) to 15 MPa (150 bar), from 7 MPa (70 bar) to 15 MPa (150 bar), or from 10 MPa (100 bar) to 15 MPa (150 bar).

The second slurry reactor 130 may include one or more vapor outlets 135 operable to pass gaseous constituents out of the second slurry reactor 130 as a gaseous constituent effluent 137. The one or more vapor outlets 135 may be operable to separate the gaseous constituent effluent 137 from the second reactor effluent 134 after contacting the intermediate stream 122 with hydrogen 132 in the presence of the mesoporous zeolite supported metal catalyst 126. The gaseous constituents of the gaseous constituent effluent 137 may include, but are not limited to, excess hydrogen 132, light hydrocarbons (e.g., methane, ethane, etc.), sulfur components (e.g., hydrogen sulfide ($H_2S$)), or combinations of these. The gaseous constituent effluent 137 may include at least 90%, at least 95%, at least 98%, at least 99%, or even at least 99.9% by weight of the gaseous constituents produced in the second slurry reactor 130 after contacting the intermediate stream 122 with hydrogen 132 in the presence of the mesoporous zeolite supported metal catalyst 126, where the gaseous constituents generally refers to compounds that are gases at the reaction conditions in the second slurry reactor 130. The gaseous constituent effluent 137 may also include excess hydrogen 132. The gaseous constituent effluent 137 may be passed to one or more downstream treatment processes, such as but not limited to processes for recovering any light hydrocarbons from the gaseous constituent effluent 137, separation of excess hydrogen, removal of one or more contaminants, or other process.

The second slurry reactor 130 may be in fluid communication with the second separator 140 to pass the second reactor effluent 134 from the second slurry reactor 130 to the second separator 140. The second reactor effluent 134 may comprise aromatic compounds having six to eight carbon atoms. The aromatic compounds having six to eight carbon atoms may include benzene, toluene, ethyl-benzene, xylenes, or combinations thereof. The second reactor effluent 134 may include at least 90%, at least 95%, at least 98%, at least 99%, or even at least 99.9% by weight of the aromatic compounds having six to eight carbon atoms produced in the second slurry reactor 130. The second reactor effluent 134 may also include the mesoporous zeolite supported metal catalyst 126 and any unreacted constituents of the pyrolysis oil feed 102, the intermediate stream 122, or both, such as unreacted heavy aromatic compounds.

Referring again to FIG. 1, the second reactor effluent 134 may be passed to the second separator 140. The second separator 140 may be directly downstream of the second slurry reactor 130 so that the second reactor effluent 134 can be passed directly from the second slurry reactor 130 to the second separator 140 without passing through any intervening reactors or unit operations. The second separator 140 may include one or a plurality of separators. The second separator 140 may be operable to separate the second reactor effluent 134 into at least the at least one product effluent 142 and used mesoporous zeolite supported metal catalyst 144. The second separator 140 may be a vacuum distillation column. The second separator 140 may include a solid-liquid separation device operable to separate the second reactor effluent 134 into at least one at least one product effluent 142 and the used mesoporous zeolite supported metal catalyst 144. In embodiments, the second separator 140 may include a centrifuge.

Referring again to FIG. 1, the used mesoporous zeolite supported metal catalyst 144 may be recycled back to the second slurry reactor 130. The used mesoporous zeolite supported metal catalyst 144 may be recycled back to the second slurry reactor 130 through a used mesoporous zeolite supported metal catalyst recycle line. The used mesoporous zeolite supported metal catalyst recycle line may be fluidly coupled to an outlet of the second separator 140 and an inlet of the second slurry reactor 130. In embodiments, the used mesoporous zeolite supported metal catalyst recycle line may include a catalyst storage vessel. In embodiments, the used mesoporous zeolite supported metal catalyst may be further treated to increase or restore catalyst activity prior to recycling the used mesoporous zeolite supported metal catalyst back to the second slurry reactor 130. In embodiments, the used mesoporous zeolite supported metal catalyst 144 may be passed from the second separator 140 to the second slurry reactor 130.

Although the second separator 140 is depicted in FIG. 1 as separating the second reactor effluent 134 into an at least one product effluent 142 comprising aromatic compounds having six to eight carbon atoms and the used mesoporous zeolite supported metal catalyst 144, it is understood that the second separator 140 may be operable to separate the second reactor effluent 134 into a plurality of reaction product effluents, one or more of which may include aromatic compounds having six to eight carbon atoms. In embodiments, the second separator 140 may include a solid-liquid separator and a distillation unit, vacuum distillation unit, or fractionation unit downstream of the solid-liquid separator. The distillation unit, vacuum distillation unit, or fractionation unit may be operable to separate the at least one product effluent 142 into a plurality of reaction product effluents. The at least one product effluent 142 may be passed to one or more downstream processes for further separation, treatment, or processing.

Upgrading pyrolysis oil feed 102 by a two stage catalytic process of the present disclosure may produce a greater yield of benzene, toluene, ethylbenzene, xylenes, or combinations of these, compared to upgrading the pyrolysis oil by conventional single stage catalytic process. In embodiments, the systems 100 of the present disclosure may produce a combined yield of benzene, toluene, ethylbenzene, xylenes, or combinations of these, of greater than or equal to 50 wt. %, greater than or equal to 55 wt. %, or even greater than or equal to 60 wt. %, based on the total weight of the pyrolysis oil of the pyrolysis oil feed 102 introduced to the two stage catalytic process of the present disclosure.

Referring again to FIG. 1, a method for upgrading pyrolysis oil feed 102 may include contacting the pyrolysis oil feed 102 with hydrogen 104 in the presence of a mixed metal oxide catalyst 106 at reaction conditions to produce a first reactor effluent 114 comprising light aromatic compounds. As previously described in the present disclosure, contacting the pyrolysis oil feed 102 with hydrogen 104 in the presence of the mixed metal oxide catalyst 106 at the reaction conditions may convert at least a portion of the multi-ring aromatic compounds in the pyrolysis oil feed 102 to light aromatic compounds. The reaction conditions may include a temperature of from 300° C. to 500° C., a pressure of from 1 MPa (10 bar) to 20 MPa (200 bar), a volume ratio of mixed metal oxide catalyst 106 to pyrolysis oil feed 102 in the first slurry reactor 110 may range from 500 to 1500, or combinations of these reaction conditions.

The first slurry reactor 110 may have any of the features, catalysts, or operating conditions previously discussed in this disclosure for the first slurry reactor 110. The method may also include separating the first reactor effluent 114 in the first separator 120 to produce the intermediate stream 122 and the used mixed metal oxide catalyst 124. The first separator 120 may have any of the features, catalysts, or operating conditions previously discussed in this disclosure for the first separator 120.

The method may include passing the intermediate stream 122 comprising the light aromatic compounds to a second slurry reactor 130 downstream of the first slurry reactor 110. The method may include contacting the intermediate stream 122 with hydrogen 132 in the presence of a mesoporous zeolite supported metal catalyst 126 at reaction conditions to produce a second reactor effluent 134 comprising aromatic compounds having six to eight carbon atoms. As previously described in the present disclosure, contacting the intermediate stream 122 with hydrogen 132 in the presence of the mesoporous zeolite supported metal catalyst 126 at the reaction conditions may causes at least a portion of the light aromatic compounds in the intermediate stream 122 to react to form to aromatic compounds having six to eight carbon atoms. The reaction conditions may include a temperature of from 300° C. to 500° C., a pressure of from 1 MPa (10 bar) to 20 MPa (200 bar), or combinations of these reaction conditions.

The second slurry reactor 130 may have any of the features, catalysts, or operating conditions previously discussed in this disclosure for the second slurry reactor 130. The method may also include separating the second reactor effluent 134 in the second separator 140 to produce the at least one product effluent 142 and the used mesoporous zeolite supported metal catalyst 124. The second separator 140 may have any of the features, catalysts, or operating conditions previously discussed in this disclosure for the second separator 140.

EXAMPLES

The various embodiments of methods and systems for the processing of heavy oils will be further clarified by the following examples. The examples are illustrative in nature, and should not be understood to limit the subject matter of the present disclosure.

Example 1: Mixed Metal Oxide Catalyst Preparation

To prepare a mixed metal oxide catalyst comprising iron oxide, zirconium oxide, cerium oxide, and aluminum oxide, 40 grams (g) of iron(III) nitrate nonahydrate ($Fe(NO_3)_3 \cdot 9H_2O$) was dissolved in 800 milliliters (mL) of distilled water to make Solution A. Then, the other metal oxide precursors were added into Solution A. Specifically, 4.906 g of aluminum nitrate nonahydrate ($Al(NO_3)_3 \cdot 9H_2O$), 1.549 g of zirconium(IV) oxynitrate hydrate ($ZrO(NO_3)_2 \cdot 3 H_2O$), and 0.601 g of cerium(III) nitrate hexahydrate ($Ce(NO_3)_3 \cdot 6H_2O$) were added into Solution A to form Solution B. Solution B was then stirred for thirty minutes.

An ammonia solution, Solution C, was prepared by adding 40 mL ammonium hydroxide ($NH_4OH$) (28-30 percentages (%) $NH_3$ basis) in 60 mL distilled water. Solution C was added slowly into Solution B to produce Solution D. Solution C was added until the pH value of Solution D reached roughly 7. Solution D was then stirred for another hour.

After preparing Solution D and another hour of stirring, the precipitate was separated from Solution D and dried in an oven overnight (i.e., for about twelve hours). The dried precipitate was then calcined in air at 500 degrees Celsius (° C.) for two hours. After calcining, the dried and calcined precipitate was crushed to obtain the final mixed metal oxide catalyst.

Example 2: Mesoporous Zeolite Supported Metal Catalyst Preparation

In Example 2, the mesoporous zeolite supported metal catalyst was prepared by first upgrading the zeolite support to a hierarchical mesoporous zeolite support. The first metal catalyst, second metal catalyst, and phosphorous were then deposited on the outer surfaces and pore surface of the hierarchical mesoporous zeolite support using a heteropolyacid for the first metal catalyst precursor and phosphorous.

The starting beta zeolite was HSZ-931 HOA beta zeolite obtained from Tosoh, which is a micrometer-sized beta zeolite having a molar ratio of silica to alumina ($SiO_2/Al_2O_3$) of 28. The beta zeolite was converted to hierarchical mesoporous beta zeolite by adding 22.2 grams of the HSZ-931 HOA beta zeolite to 600 mL of a 0.2 molar (M) solution of NaOH. The mixture was then subjected to hydrothermal desilication at a temperature of 150° C. for 21 hours. The hierarchical mesoporous beta zeolite had a final molar ratio of silica to alumina after the conversion of 20. The hierarchical mesoporous beta zeolite had an average pore size of 10 nm with a peak pore size in the range of 20-25 nm, as determined by the methods previously discussed in this disclosure. The hierarchical mesoporous beta zeolite also had a pore volume of 0.59 cubic centimeters per gram.

The hierarchical mesoporous beta zeolite were ion-exchanged in 0.8 M solution of ammonium nitrate ($NH_4NO_3$) at 80° C. for 2 hours for three times (the ratio of 1 g zeolite to 10 ml $NH_4NO_3$ solution). The ion-exchanged zeolites were dried at 110° C. and then calcined at 550° C. for five hours with a heating rate of 5 degrees Celsius per minute (° C./min).

The acidity of the hierarchical mesoporous beta zeolite was adjusted by dealumination in a diluted nitric acid solution. In particular, for Example 2, the hierarchical mesoporous beta zeolite was dealimunated by contacting the hierarchical mesoporous beta zeolite with a 0.2 M solution of nitric acid ($HNO_3$) at 80° C. for a period of 2 hours. The dealuminated hierarchical mesoporous beta zeolite was then ion-exchanged in a 0.8 M solution of ammonium nitrate ($NH_4NO_3$) for 2 hours at 80° C. one time. The ion-exchanged dealuminated hierarchical mesoporous beta zeolite was then dried and calcined at 550° C. for 5 hours to produce the hierarchical mesoporous beta zeolite support of Example 2, which is referred to in this disclosure as Beta-M50 zeolite support.

The mesoporous zeolite supported metal catalyst of Example 2 was then produced by adding 5 grams of the Beta-M50 zeolite support to a round bottom flask. Solution A was prepared by dissolving 1.44 grams of the heteropolyacid of the first metal catalyst precursor [$H_3PMo_{12}O_{40}$] in 15 mL of distilled water. Solution B was then prepared by dissolving 1.12 grams of the second metal catalyst precursor [$Co(NO_3)_2 \cdot 6H_2O$] in 15 mL of distilled water. Solution A and Solution B were then mixed together and added to the Beta-M50 zeolite support in the round bottom flask. The combined solution and the Beta-M50 zeolite support were mixed for 2 hours. The water was removed from the Beta-M50 zeolite support impregnated with the first and second metal catalyst precursors under vacuum at a temperature of 50° C., and the resulting mesoporous zeolite supported metal catalyst precursor was dried overnight at a temperature of 100° C. The dried mesoporous zeolite supported metal catalyst precursor was then calcined at a temperature of 500° C. for five hours to obtain the mesoporous zeolite supported metal catalyst of Example 2.

Example 3: Upgrading Pyrolysis Oil in the Presence of a Mixed Metal Oxide Catalyst and a Mesoporous Zeolite Supported Metal Catalyst In Example 3, the performance of the process including the mixed metal oxide catalyst of Example 1 and the mesoporous zeolite supported metal catalyst of Example 2 for upgrading pyrolysis oil was evaluated. Raw pyrolysis oil from a stream cracker was mixed with toluene as a diluent to produce the pyrolysis oil feed. The toluene was added as a diluent to increase the fluidity of the pyrolysis oil feed so that the pyrolysis oil can better contact the MMO catalyst surface. In particular, 16.74 g of pyrolysis oil was combined with 4.37 g of toluene to produce the pyrolysis oil feed. The resulting pyrolysis oil feed and 12.17 g of the mixed metal oxide catalyst of Example 1 were added to a first slurry reactor and mixed.

After adding the pyrolysis oil (with toluene) and mixed metal oxide catalyst to the first slurry reactor under atmospheric pressure and at room temperature, the first slurry reactor was sealed. The first slurry reactor was purged with pure hydrogen gas three times. The pressure was then increased to 140 bar (14 MPa) by introducing pure hydrogen gas at room temperature. The pyrolysis oil (with toluene) and mixed metal oxide catalyst were then heated to 400° C. and continuously stirred for four hours.

After the reaction, the first slurry reactor was cooled to room temperature. Then, the gas mixture was released and collected into a gas bag. The gas mixture was analyze using gas chromatography. The reaction effluent was transferred to a separator (centrifuge). The reaction effluent was centrifuged at 10,000 revolutions per minute (rpm) for twenty minutes. Two layers were obtained after centrifuging, a top layer comprising the intermediate stream comprising di-aromatic compounds, tri-aromatic compounds, or both and a bottom layer comprising the used mixed metal oxide catalyst. The used mixed metal oxide catalyst was then washed with toluene to remove any condensate followed and vacuum dried. The used mixed metal oxide catalyst was vacuum dried at room temperature first and then at 100° C. The boiling point distribution of intermediate stream was analyzed in FIG. 4. As shown in FIG. 4, the intermediate stream 122 included di-aromatic compounds comprising 10 to 18 carbon atoms. The linear part in the intermediate stream curve shown in FIG. 4 was mainly toluene dilute included in the pyrolysis oil feed.

The intermediate stream and 10.0 g of the mesoporous zeolite supported metal catalyst of Example 2 were added to the second slurry reactor and mixed. After adding the intermediate stream and mesoporous zeolite supported metal catalyst to the second slurry reactor under atmospheric pressure and at room temperature, the second slurry reactor was sealed. The second slurry reactor was purged with pure hydrogen gas three times. The pressure was then increased to 60 bar (6 MPa) by introducing pure hydrogen gas at room temperature. The intermediate stream and mesoporous zeolite supported metal catalyst were then heated to 400° C. and continuously stirred for four hours.

After the reaction, the second slurry reactor was cooled to room temperature. Then, the gas mixture was released and collected into a gas bag. The gas mixture was analyze using gas chromatography. The reaction effluent was transferred to a separator (centrifuge). The reaction effluent was centrifuged at 10,000 revolutions per minute (rpm) for twenty minutes. Two layers were obtained after centrifuging, a top layer comprising the aromatic compounds having six to eight carbon atoms and a bottom layer comprising the used mesoporous zeolite supported metal catalyst. The used mesoporous zeolite supported metal catalyst was then washed with toluene to remove any condensate followed and vacuum dried. The used mesoporous zeolite supported metal catalyst was vacuum dried at room temperature first and then at 100° C.

Figure 3:
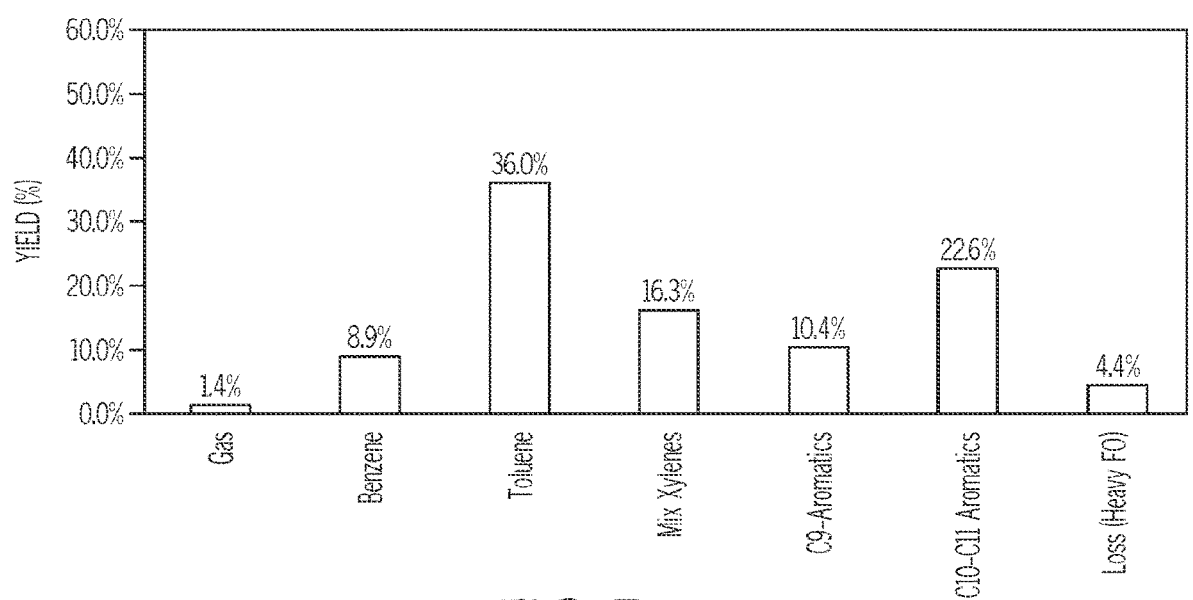
FIG. 3 graphically depicts weight percentage (y-axis) of various product effluent (x-axis) present in the second reactor effluent produced from Example 3, according to one or more embodiments shown and described in this disclosure.

FIG. 3 provides the characteristics of the reaction effluent. As shown in FIGS. 3 and 4, multi-ring aromatic compounds in the pyrolysis oil was passed to the first slurry reactor including the mixed metal oxide catalyst to produce the intermediate stream including di-aromatic compounds. Di-aromatic compounds included the intermediate stream were passed to the second slurry reactor and then hydrocracked to produce BTEX. After two stages, the overall net yield of benzene, toluene, and xylenes was 61.2%. In FIG. 3, the net yield for toluene shown represents the amount of toluene produced by the reactions and does not include any contribution from the toluene added as a diluent.

Comparative Example 4: First Slurry Reactor Only

In Comparative Example 4, the performance of the mixed metal oxide catalyst of Example 1 alone for upgrading pyrolysis oil was evaluated. 16.74 g of pyrolysis oil and 12.17 g of the mixed metal oxide catalyst of Example 1 were added to a batch reactor and mixed. Before adding the pyrolysis oil, the pyrolysis oil was mixed with 4.37 g of toluene as a diluent to increase the fluidity of the pyrolysis oil such that the pyrolysis oil could have full contact with the surface of the mixed metal oxide catalyst.

After adding the pyrolysis oil (with toluene) and mixed metal oxide catalyst to the slurry reactor under atmospheric pressure and at room temperature, the batch reactor was sealed. The slurry reactor was purged with pure hydrogen gas three times. The pressure was then increased to 140 bar (14 MPa) by introducing pure hydrogen gas at room temperature. The pyrolysis oil (with toluene) and mixed metal oxide catalyst were then heated to 400° C. and continuously stirred for four hours.

After the reaction, the batch reactor was cooled to room temperature. Then, the gas mixture was released and collected into a gas bag. The gas mixture was analyze using gas chromatography. The reaction effluent was transferred to a separator (centrifuge). The reaction effluent was centrifuged at 10,000 rpm for twenty minutes. Two layers were obtained after centrifuging, a top layer comprising the reaction product and a bottom layer comprising the used mixed metal oxide catalyst. The used mixed metal oxide catalyst was then washed with toluene to remove any condensate followed and vacuum dried. The used mixed metal oxide catalyst was vacuum dried at room temperature first and then at 100° C. The reaction product effluent was analyzed through simulated distillation (SIMDIS) gas chromatography, paraffins, isoparaffins, olefins, naphthenes, and aromatics (PIONA) gas chromatography, and high performance liquid chromatography (HPLC).

Table 1 provides the reaction conditions, characteristics of the pyrolysis oil, and characteristics of the reaction effluent.

TABLE 1

Reaction Conditions, Characteristics of Pyrolysis Oil, and Characteristics of Reaction Effluent

| Parameter | Value |
|---|---|
| Reaction Temperature (° C.) | 400 |
| Total Pressure Before Heating to Reaction Temperature (MPa) | 14 |
| Time on Stream (hours) | 4 |
| $C_{16}$ and $C_{16+}$ in Pyrolysis Oil (wt. %) | 41.3 |
| $C_{16}$ and $C_{16+}$ in Reaction Effluent (wt. %) | 0.5 |
| $C_{16}$ and $C_{16+}$ Conversion (%) | 98.8 |
| $H_2$ Conversion (%) | 33.5 |
| Gas Product Yield (wt. %) | 3.9 |
| Liquid Product Yield[1] (wt. %) | 96.1 |
| Mono-Aromatics ($C_6$-$C_9$) Yield (wt. %) | 41.3 |
| Di-Aromatics ($C_{10}$-$C_{13}$) Yield (wt. %) | 40.8 |
| Tri-Aromatics ($C_{14}$-$C_{16}$) Yield (wt. %) | 14.4 |
| Coke/Feed (%) | 0 |

[1]Toluene diluent was not considered as a product.

As shown in FIG. 3 and Table 1, Example 3 was more effective to convert the tetra-aromatics ($C_{16}$ and $C_{16+}$ hydrocarbons) in the pyrolysis oil to BTEX as compared to Comparative Example 4. While mono-aromatic yield of Comparative Example 4 was 41.3 wt. %, the BTEX yield of Example 3 was 61.2 wt. %.

A first aspect of the present disclosure may be directed to a method for upgrading pyrolysis oil. The method may include contacting a pyrolysis oil feed with hydrogen in the presence of a mixed metal oxide catalyst in a first slurry reactor. The pyrolysis oil feed may include multi-ring aromatic compounds comprising greater than or equal to sixteen carbon atoms. The mixed metal oxide catalyst may include a plurality of catalyst particles and each of the plurality of catalyst particles comprises a plurality of different metal oxides. The method may further include contacting the pyrolysis oil feed with hydrogen in the presence of the mixed metal oxide catalyst in the first slurry reactor to convert at least a portion of the multi-ring aromatic compounds in the pyrolysis oil feed to light aromatic compounds comprising di-aromatic compounds, tri-aromatic compounds, or both, and passing an intermediate stream comprising the light aromatic compounds to a second slurry reactor downstream of the first slurry reactor. The method may further include contacting the intermediate stream with hydrogen in the presence of a mesoporous zeolite supported metal catalyst in a second slurry reactor to convert at least a portion of the light aromatic compounds in the intermediate stream to react to form aromatic compounds having six to eight carbon atoms.

A second aspect of the present disclosure may include the first aspect, in which the aromatic compounds having six to eight carbon atoms may comprise benzene, toluene, ethylbenzene, xylenes, or combinations thereof.

A third aspect of the present disclosure may include either one of the first or second aspects, further comprising separating a first reactor effluent from the first slurry reactor in a first separator to produce used mixed metal oxide catalyst and the intermediate stream.

A fourth aspect of the present disclosure may include any one of the first through third aspects, further comprising recycling the used mixed metal oxide catalyst back to the first slurry reactor.

A fifth aspect of the present disclosure may include any one of the first through fourth aspects, comprising passing the first reactor effluent directly from the first slurry reactor to the first separator.

A sixth aspect of the present disclosure may include any one of the first through fifth aspects, comprising passing the intermediate stream directly from the first separator to the second slurry reactor.

A seventh aspect of the present disclosure may include any one of the first through sixth aspects, further comprising separating a second reactor effluent from the second slurry reactor in a second separator to produce a used mesoporous zeolite supported metal catalyst and a product effluent comprising the aromatic compounds.

An eighth aspect of the present disclosure may include any one of the first through seventh aspects, further comprising passing the product effluent out of the process.

A ninth aspect of the present disclosure may include any one of the first through eighth aspects, further comprising recycling the used mesoporous zeolite supported metal catalyst back to the second slurry reactor.

A tenth aspect of the present disclosure may include any one of the first through ninth aspects, in which the pyrolysis oil feed comprises greater than or equal to 30 wt. % multi-ring aromatic compounds having greater than or equal to sixteen carbon atoms based on the total weight of the pyrolysis oil in the pyrolysis oil feed.

An eleventh aspect of the present disclosure may include any one of the first through tenth aspects, comprising contacting the pyrolysis oil feed with hydrogen in the presence of the mixed metal oxide catalyst in the first slurry reactor at a temperature of from 300° C. to 500° C., or from 350° C. to 400° C.

A twelfth aspect of the present disclosure may include any one of the first through eleventh aspects, comprising contacting the pyrolysis oil feed with hydrogen in the presence of the mixed metal oxide catalyst in the first slurry reactor at a pressure of from 1 MPa (10 bar) to 20 MPa (200 bar), or from 10 MPa (100 bar) to 15 MPa (150 bar).

A thirteenth aspect of the present disclosure may include any one of the first through twelfth aspects, comprising contacting the pyrolysis oil feed with hydrogen in the presence of the mixed metal oxide catalyst in the first slurry reactor at a volume ratio of hydrogen to the pyrolysis oil feed of from 500 to 1500, or from 800 to 1200.

A fourteenth aspect of the present disclosure may include any one of the first through thirteenth aspects, in which each of the first metal oxide and the second metal oxide may comprise oxides of metals in groups 3-13 of the International Union of Pure and Applied Chemistry (IUPAC) periodic table.

A fifteenth aspect of the present disclosure may include any one of the first through fourteenth aspects, in which each of the first metal oxide and the second metal oxide may comprise oxides of iron, zirconium, cerium, aluminum, tungsten, molybdenum, titanium, or combinations of these.

A sixteenth aspect of the present disclosure may include any one of the first through fifteenth aspects, in which each of the first metal oxide and the second metal oxide may comprise oxides of one or metals selected from the group consisting of iron, zirconium, cerium, aluminum, tungsten, molybdenum, titanium, and combinations of these.

A seventeenth aspect of the present disclosure may include any one of the first through sixteenth aspects, in which each of the first metal oxide and the second metal oxide may comprise oxides of metals selected from the group consisting of iron, zirconium, cerium, aluminum, tungsten, molybdenum, titanium, and combinations of these.

An eighteenth aspect of the present disclosure may include any one of the first through seventeenth aspect, in which the mixed metal oxide catalyst may comprise from 60 wt. % to 95 wt. % iron oxide; from 1 wt. % to 20 wt. % zirconium oxide; from 0.1 wt. % to 10 wt. % cerium oxide; and from 1 wt. % to 20 wt. % aluminum oxide, where the weight percentages are based on the total weight of the mixed metal oxide catalyst.

A nineteenth aspect of the present disclosure may include any one of the first through eighteenth aspects, in which contacting the pyrolysis oil feed with hydrogen in the presence of the mixed metal oxide catalyst in the first slurry reactor may convert the portion of the multi-ring aromatic compounds in the pyrolysis oil feed to the light aromatic compounds in a single step, without conducting a subsequent chemical reaction step.

A twentieth aspect of the present disclosure may include any one of the first through nineteenth aspects, further comprising mixing the pyrolysis oil feed with toluene upstream of the first slurry reactor to produce a feed stream and passing the feed stream to the first slurry reactor.

A twenty-first aspect of the present disclosure may include any one of the first through twentieth aspects, comprising mixing the pyrolysis oil and a diluent to produce the pyrolysis oil feed having an amount of diluent of from 10 wt. % to 90 wt. %, or from 60 wt. % to 80 wt. % based on the total weight of the pyrolysis oil feed.

A twenty-second aspect of the present disclosure may include any one of the first through twenty-first aspects, comprising contacting the intermediate stream with hydrogen in the presence of the mesoporous zeolite supported metal catalyst in the second slurry reactor at a temperature of from 300° C. to 500° C., or from 350° C. to 400° C.

A twenty-third aspect of the present disclosure may include any one of the first through twenty-second aspects, comprising contacting the intermediate stream with hydrogen in the presence of the mesoporous zeolite supported metal catalyst in the second slurry reactor at a pressure of from 1 MPa (10 bar) to 20 MPa (200 bar), or from 10 MPa (100 bar) to 15 MPa (150 bar).

A twenty-fourth aspect of the present disclosure may include any one of the first through twenty-third aspects, in which the mesoporous zeolite supported metal catalyst may comprise a first metal catalyst and a second metal catalyst supported on a mesoporous zeolite support.

A twenty-fifth aspect of the present disclosure may include any one of the first through twenty-fourth aspects, in which at least one of the first metal catalyst and the second metal catalyst may comprise a heteropolyacid.

A twenty-sixth aspect of the present disclosure may include any one of the first through twenty-fifth aspects, in which the heteropolyacid may comprise at least one metal selected from cobalt, molybdenum, vanadium, or combinations of these, and at least one heteroatom selected from phosphorous, silicon, arsenic, germanium, or combinations of these.

A twenty-seventh aspect of the present disclosure may include any one of the first through twenty-sixth aspects, in which the first metal catalyst may comprise a first heteropolyacid and the second metal catalyst may comprise a second heteropolyacid that is different from the first heteropolyacid.

A twenty-eighth aspect of the present disclosure may include any one of the first through twenty-seventh aspects, in which the heteropolyacid may comprise a Keggin structure having general formula $XM_{12}O_{40}{}^{n-}$ or a Dawson structure having the general formula $XM_{18}O_{82}{}^{n-}$, in which X is the heteroatom; M is molybdenum and optionally one or more of cobalt, vanadium, or a combination of these; and n– is an integer indicative of the charge of the anion of the heteropolyacid.

A twenty-ninth aspect of the present disclosure may include any one of the first through twenty-eighth aspects, in which the heteropolyacid may comprise phosphormolybdic heteropolyacid having formula $H_3PMo_{12}O_{40}$, decamolybdodicobaltate heteropolyacid having chemical formula $H_6[Co_2Mo_{10}O_{38}H_4]$, or silicomolybdic heterpolyacid having chemical formula $H_4[SiMo_{12}O_{40}]$.

A thirtieth aspect of the present disclosure may include any one of the first through twenty-ninth aspects, in which the mesoporous zeolite support may have an average pore size of from 2 nm to 40 nm as determined by Barrett-Joyner-Halenda (BJH) method.

A thirty-first aspect of the present disclosure may include any one of the first through thirtieth aspects, in which the zeolite support may comprise a molar ratio of silica to alumina of from 10 to 70.

A thirty-second aspect of the present disclosure may include any one of the first through thirty-first aspects, in which contacting the light aromatic compounds with hydrogen in the presence of the mesoporous zeolite supported metal catalyst in the second slurry reactor may convert the portion of the light aromatic compounds to the aromatic compounds having six to eight carbon atoms in a single step, without conducting a subsequent chemical reaction step.

A thirty-third aspect of the present disclosure may include any one of the first through thirty-second aspects, in which contacting the pyrolysis oil feed with hydrogen in the presence of the mixed metal oxide catalyst and contacting the light aromatic compounds with hydrogen in the presence of the mesoporous zeolite supported metal catalyst may result in a yield of greater than or equal to 60 wt. % of the aromatic compounds having six to eight carbons based on the total weight of pyrolysis oil in the pyrolysis oil feed.

A thirty-fourth aspect of the present disclosure may be directed to a system for upgrading pyrolysis oil. The system may include a first slurry reactor comprising a mixed metal oxide catalyst. The mixed metal oxide catalyst may include a plurality of catalyst particles and each of the plurality of catalyst particles comprises a plurality of different metal oxides. The first slurry reactor may be operable to contact a pyrolysis oil feed with hydrogen in the presence of the mixed metal oxide catalyst to produce a first reactor effluent comprising light aromatic compounds that include di-aromatic compounds, tri-aromatic compounds, or both. The system may further include a first separator disposed downstream of the first slurry reactor and operable to separate the first reactor effluent to produce a used mixed metal oxide catalyst and an intermediate stream comprising the light aromatic compounds, and a second slurry reactor downstream of the first separator and comprising a mesoporous zeolite supported metal catalyst. The second slurry reactor may be operable to contact the intermediate stream with hydrogen in the presence of the mesoporous zeolite supported metal catalyst to produce a second reactor effluent comprising aromatic compounds having six to eight carbon atoms. The system may further include a second separator disposed downstream of the second slurry reactor and operable to separate the second reactor effluent to produce a used mesoporous zeolite supported metal catalyst and at least one product effluent comprising aromatic compounds having six to eight carbon atoms.

A thirty-fifth aspect of the present disclosure may include the thirty-fourth aspect, where the first slurry reactor may be operable to contact the pyrolysis oil feed with hydrogen in the presence of the mixed metal oxide catalyst at a temperature of from 300° C. to 500° C., or from 350° C. to 400° C.

A thirty-sixth aspect of the present disclosure may include either the thirty-fourth or thirty-fifth aspect, where the first slurry reactor may be operable to contact the pyrolysis oil feed with hydrogen in the presence of the mixed metal oxide catalyst at a pressure of from 1 MPa (10 bar) to 20 MPa (200 bar), or from 10 MPa (100 bar) to 15 MPa (150 bar).

A thirty-seventh aspect of the present disclosure may include any one of the thirty-fourth through thirty-sixth aspects, where the second slurry reactor may be operable to contact the light aromatic compounds with hydrogen in the presence of the mesoporous zeolite supported metal catalyst at a temperature of from 300° C. to 500° C., or from 350° C. to 400° C.

A thirty-eighth aspect of the present disclosure may include any one of the thirty-fourth through thirty-seventh aspects, where the second slurry reactor may be operable to contact the light aromatic compounds with hydrogen in the presence of the mesoporous zeolite supported metal catalyst at a pressure of from 1 MPa (10 bar) to 20 MPa (200 bar), or from 10 MPa (100 bar) to 15 MPa (150 bar).

A thirty-ninth aspect of the present disclosure may include any one of the thirty-fourth through thirty-eighth aspects, in which the first separator may be directly downstream of the first slurry reactor.

A fortieth aspect of the present disclosure may include any one of the thirty-fourth through thirty-fourth aspects, in which the second slurry reactor may be directly downstream of the first separator.

A forty-first aspect of the present disclosure may include any one of the thirty-fourth through fortieth aspects, in which the second separator may be directly downstream of the second slurry reactor.

A forty-second aspect of the present disclosure may include any one of the thirty-fourth through forty-first aspects, in which the mesoporous zeolite supported metal catalyst may comprise a first metal catalyst and a second metal catalyst supported on a mesoporous zeolite support.

A forty-third aspect of the present disclosure may include any one of the thirty-fourth through forty-second aspects, in which the used mixed metal oxide catalyst may be recycled back to the first slurry reactor.

A forty-fourth aspect of the present disclosure may include any one of the thirty-fourth through forty-third aspects, in which the used mesoporous zeolite supported metal catalyst may be recycled back to the second slurry reactor.

As used in the Specification and appended Claims, the singular forms "a", "an", and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced. For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter. The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

It is noted that one or more of the following claims utilize the term "where" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

It should be understood that any two quantitative values assigned to a property may constitute a range of that property, and all combinations of ranges formed from all stated quantitative values of a given property are contemplated in this disclosure.

Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Rather, the claims appended hereto should be taken as the sole representation of the breadth of the present disclosure and the corresponding scope of the various embodiments described in this disclosure. Further, it will be apparent that modifications and variations are possible without departing from the scope of the appended claims.

What is claimed is:

1. A system for upgrading pyrolysis oil, the system comprising:
   a mixed metal oxide catalyst comprising a plurality of catalyst particles, where each of the plurality of catalyst particles comprises a plurality of different metal oxides;
   a first slurry reactor configured to contact a pyrolysis oil feed with hydrogen in the presence of the mixed metal oxide catalyst to produce a first reactor effluent comprising light aromatic compounds that include di-aromatic compounds, tri-aromatic compounds, or both;
   a first separator disposed downstream of the first slurry reactor and configured to separate the first reactor effluent to produce a used mixed metal oxide catalyst and an intermediate stream comprising the light aromatic compounds;
   a mesoporous zeolite supported metal catalyst;
   a second slurry reactor downstream of the first separator and configured to contact the intermediate stream with hydrogen in the presence of the mesoporous zeolite supported metal catalyst to produce a second reactor effluent comprising aromatic compounds having six to eight carbon atoms; and
   a second separator disposed downstream of the second slurry reactor and configured to separate the second reactor effluent to produce a used mesoporous zeolite supported metal catalyst and at least one product effluent comprising aromatic compounds having six to eight carbon atoms.

2. The system of claim 1, in which the first separator is directly downstream of the first slurry reactor.

3. The system of claim 1, in which the second slurry reactor is directly downstream of the first separator.

4. The system of claim 1, in which the used mixed metal oxide catalyst is recycled back to the first slurry reactor.

5. The system of claim 1, in which the used mesoporous zeolite supported metal catalyst is recycled back to the second slurry reactor.

6. The system of claim 1, wherein plurality of metal oxides of the mixed metal oxide catalyst comprise oxides of metals in groups 3-13 of the International Union of Pure and Applied Chemistry (IUPAC) periodic table.

7. The system of claim 1, wherein the plurality of metal oxides in the mixed metal oxide catalyst are selected from the group consisting of iron oxide ($Fe_2O_3$), zirconium oxide ($ZrO_2$), cerium oxide ($CeO_2$), aluminum oxide (alumina) ($Al_2O_3$), silica ($SiO_2$), tungsten oxide ($WO_3$), molybdenum oxide ($MoO_3$), titanium oxide ($TiO_2$), and combinations of these.

8. The system of claim 1, wherein the mixed metal oxide catalyst comprises from 60 wt. % to 95 wt. % iron oxide, based on the total weight of the mixed metal oxide catalyst.

9. The system of claim 1, wherein the mixed metal oxide catalyst comprises from 1 wt. % to 20 wt. % zirconium oxide, based on the total weight of the mixed metal oxide catalyst.

10. The system of claim 1, wherein the mixed metal oxide catalyst comprises from 0.1 wt. % to 10 wt. % cerium oxide, based on the total weight of the mixed metal oxide catalyst.

11. The system of claim 1, wherein the mixed metal oxide catalyst comprises from 1 wt. % to 20 wt. % aluminum oxide ($Al_2O_3$), based on the total weight of the mixed metal oxide catalyst.

12. The system of claim 1, wherein the mixed metal oxide catalyst comprises from 60 wt. % to 95 wt. % iron oxide, from 1 wt. % to 20 wt. % zirconium oxide, from 0.1 wt. % to 10 wt. % cerium oxide, and from 1 wt. % to 20 wt. % aluminum oxide ($Al_2O_3$), based on the total weight of the mixed metal oxide catalyst.

13. The system of claim 1, wherein the mixed metal oxide catalyst comprises 83 wt. % iron oxide, 7.5 wt. % zirconium oxide, 2.5 wt. % cerium oxide, and 7.0 wt. % aluminum oxide ($Al_2O_3$).

14. The system of claim 1, wherein the first slurry reactor is configured to contact the pyrolysis oil feed with hydrogen in the presence of the mixed metal oxide catalyst at a temperature of from 300° C. to 500° C. and a pressure of from 1 MPa to 20 MPa.

15. The system of claim 1, wherein the mesoporous zeolite supported metal catalyst comprises a first metal catalyst and a second metal catalyst supported on a mesoporous zeolite support.

16. The system of claim 15, wherein the first metal catalyst, the second metal catalyst, or both comprises a heteropolyacid.

17. The system of claim 16, wherein the heteropolyacid comprises:

at least one metal selected from cobalt, molybdenum, vanadium, or combinations of these; and at least one heteroatom selected from phosphorous, silicon, arsenic, germanium, or combinations of these.

18. The system of claim 16, wherein the heteropolyacid comprises phosphormolybdic heteropolyacid having formula $H_3PMo_{12}O_{40}$, decamolybdodicobaltate heteropolyacid having chemical formula $H_6[Co_2Mo_{10}O_{38}H_4]$, or silicomolybdic heterpolyacid having chemical formula $H_4[SiMo_{12}O_{40}]$.

19. The system of claim 15, wherein the first metal catalyst comprises a first heteropolyacid and the second metal catalyst comprises a second heteropolyacid that is different from the first heteropolyacid.

20. The system of claim 1, wherein the second slurry reactor is configured to contact the light aromatic compounds with hydrogen in the presence of the mesoporous zeolite supported metal catalyst at a temperature of from 300° C. to 500° C. and a pressure of from 1 MPa to 20 MPa.

* * * * *